US010374721B2

(12) United States Patent
Awadalla et al.

(10) Patent No.: US 10,374,721 B2
(45) Date of Patent: Aug. 6, 2019

(54) TRANSMISSION OF SUBCARRIERS HAVING DIFFERENT MODULATION FORMATS

(71) Applicant: Infinera Corporation, Annapolis Juction, MD (US)

(72) Inventors: Ahmed Awadalla, Gatineau (CA); Abdullah Karar, Kingston (CA); Han Henry Sun, Ottawa (CA); Kuang-Tsan Wu, Kanata (CA)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 14/986,521

(22) Filed: Dec. 31, 2015

(65) Prior Publication Data
US 2016/0323039 A1    Nov. 3, 2016

Related U.S. Application Data

(60) Provisional application No. 62/154,150, filed on Apr. 29, 2015.

(51) Int. Cl.
*H04J 14/02* (2006.01)
*H04B 10/516* (2013.01)

(52) U.S. Cl.
CPC ........ *H04B 10/5161* (2013.01); *H04J 14/026* (2013.01); *H04J 14/0298* (2013.01)

(58) Field of Classification Search
CPC .......................... H04B 10/5161; H04J 14/026; H04J 14/0298
See application file for complete search history.

(56) References Cited

U.S. PATENT DOCUMENTS

2011/0255875 A1* 10/2011 Mertz ................ H04B 10/5561
398/183
2011/0291865 A1    12/2011 Sun et al.
(Continued)

FOREIGN PATENT DOCUMENTS

| EP | 3 195 506 | 1/2019 |
| WO | WO 2014/130386 | 8/2014 |

OTHER PUBLICATIONS

Sun et al, Comparison of Two Modulation Formats at Spectral Efficiency of 5 Bits/Dual-Pol Symbol (published in IEEE Xplore Oct. 2013).*

*Primary Examiner* — Casey L Kretzer
(74) *Attorney, Agent, or Firm* — David L. Soltz

(57) ABSTRACT

Consistent with the present disclosure, an optical communication system is provided in which data is carried over optical signals including subcarriers. The subcarriers may be modulated with the standard modulation formats noted above, but the modulation formats are selectively assigned to the subcarriers, such that some subcarriers are modulated with different standard modulation formats than others. As used herein, a "standard modulation format" is one of BPSK, and n-QAM, where n is an integer greater than one. Such n-QAM modulation formats include of 3-QAM, 4-QAM (QPSK), 8-QAM, 16-QAM, 64-QAM, 128-QAM, and 256-QAM. By selecting the number of subcarriers and the types of modulation formats employed, an optical signal with an effective SE that is between that of the standard modulation formats can be generated for transmission over a distances that more closely matches the link distance. Such custom or intermediate SE signals can be tailored to a particular optical link SNR to provide data transmission rates that are higher than the low order modulation formats that would otherwise be employed for optical signals carried (Continued)

by such links. As a result, more efficient data transmission can be achieved.

16 Claims, 16 Drawing Sheets

(56) References Cited

U.S. PATENT DOCUMENTS

| | | | |
|---|---|---|---|
| 2012/0230694 A1* | 9/2012 | Tanaka | H04B 10/506 398/79 |
| 2013/0209091 A1* | 8/2013 | Mateosky | H04B 10/07953 398/26 |
| 2014/0092924 A1 | 4/2014 | Krause et al. | |
| 2014/0363164 A1 | 12/2014 | Kim et al. | |
| 2015/0071641 A1* | 3/2015 | Wen | H04B 10/5165 398/98 |
| 2015/0086215 A1* | 3/2015 | Chen | H04B 10/2507 398/136 |
| 2015/0280834 A1 | 10/2015 | Sun et al. | |
| 2015/0280853 A1 | 10/2015 | Sun et al. | |
| 2015/0318931 A1* | 11/2015 | Song | H04J 14/02 398/76 |
| 2016/0261347 A1 | 9/2016 | Karar et al. | |
| 2016/0315714 A1 | 10/2016 | Awadalla et al. | |

\* cited by examiner

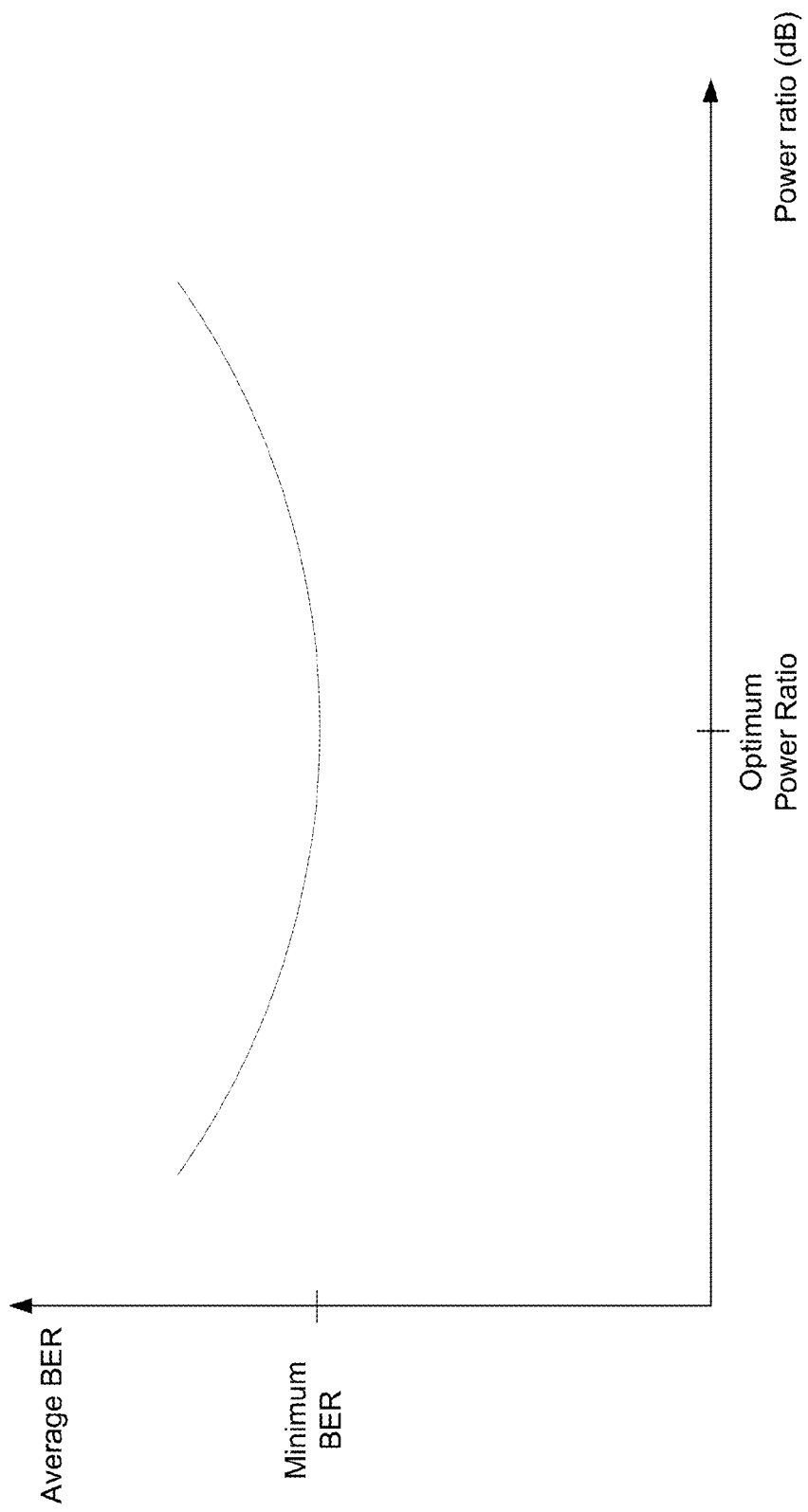

TRANSMISSION OF SUBCARRIERS HAVING DIFFERENT MODULATION FORMATS

This application claims priority under 35 U.S.C. § 119 to U.S. Provisional Patent Application No. 62/154,150, filed on Apr. 29, 2015, 2015, the content of which is incorporated by reference herein in its entirety.

Optical communication systems are known in which data is carried over amplitude/phase modulated optical signals, which are transmitted along an optical fiber link to a receiver node. Such optical signals may be transmitted in accordance with a variety of standard modulation formats using polarization multiplexing (also known as dual polarization), such as binary phase shift keying (BPSK), 3-quadrature amplitude modulation (3-QAM), quadrature phase shift keying (QPSK, or 4-QAM), 8-QAM, 16-QAM, 32-QAM, and 64-QAM, with spectral efficiency (SE) of 2, 3, 4, 6, 8, 10, and 12 b/dual-pol-symbol, respectively. Higher order modulation formats have a high SE, as well as an associated constellation with points that are relatively close to one another. Accordingly, distinguishing such constellation points may be difficult, especially if the high SE signal is transmitted over an optical link that has an associated low signal-to-noise ratio (SNR) or has other impairments. As a result, high SE signals are more susceptible to noise and may have higher bit error rate for a given SNR. On the other hand, low order modulation format signals have a low SE, with associated constellation points that are relatively far apart. Thus, transmission of such low SE (i.e., low order modulation format) signals over a link with an associated SNR will incur fewer errors than if high SE signals were transmitted. Put another way, for a given SNR, high SE signals will incur more errors and have a higher bit error rate (BER) than low SE signals.

Thus, there is a tradeoff between capacity and reach. Lower order modulation formats having a low SE can be transmitted farther because fewer errors are incurred, but such lower order modulation formats have fewer bits per symbol and thus less capacity. Higher order modulation formats, on the other hand, have a higher SE, such that more bits per symbol can be transmitted to provide greater capacity. However, such higher order modulation formats are more susceptible to errors, and thus, for a given power level, cannot be transmitted over longer distances because the farther an optical signal is transmitted the more errors will be incurred.

Thus, a given modulation format can be transmitted a certain distance, which as noted above, is longer for lower order modulation formats, and shorter for higher order modulation formats. If the length of a particular link, however, is between the transmission distances associated with one of the standard modulation formats, the standard modulation format having a transmission distance closest to that of the link, but having an associated BER less than that associated with the link will be selected. However, although relatively few errors will occur because the selected standard modulation format transmission distance is significantly more than the link distance, the capacity of the selected standard modulation format will be less than that which could be realized if an intermediate modulation format having a transmission distance close to that of the link were employed.

Although transmission with intermediate modulation formats, such as 5-QAM (5b/dual-pol-symbol) and 7-QAM (7b/dual-pol-symbol), other than the standard modulation formats, can be used, the circuitry required to generate/decode such modulation formats is complex and requires relatively high gate counts and high power in implementation.

Thus, there is a need for optical communication systems that can generate, without complex circuitry, optical communication signals that have SEs between those of the standard modulation formats, such as BPSK, QPSK, 3-QAM, 8-QAM, 16-QAM, 32-QAM and 64-QAM for example.

SUMMARY

Consistent with an aspect of the present disclosure, an apparatus is provided that comprises a laser that supplies light and a modulator that receives the light. In addition, a transmission circuit is provided that supplies an electrical signal to the modulator, the modulator modulating the light based on the electrical signal to generate a modulated optical signal having first and second pluralities of subcarriers. Each of the first plurality of subcarriers has an associated first modulation format and each of the second plurality of subcarriers has an associated second modulation format, which is different than the first modulation format.

Consistent with a first aspect of the present disclosure, an apparatus is provided that includes a laser that supplies light, and a modulator that receives the light. The apparatus further includes a transmission circuit, such that, based on a plurality of control signals, electrical signals are supplied to the modulator, the modulator modulates the light to supply first and second pluralities of subcarriers based on the electrical signals, each of the first plurality of subcarriers having an associated first modulation format and each of the second plurality of subcarriers having an associated second modulation format, which is different than the first modulation format.

It is to be understood that both the foregoing general description and the following detailed description are exemplary and explanatory only and are not restrictive of the invention, as claimed.

The accompanying drawings, which are incorporated in and constitute a part of this specification, illustrate one (several) embodiment(s) of the invention and together with the description, serve to explain the principles of the invention.

BRIEF DESCRIPTION OF THE DRAWINGS

FIG. 5b illustrates a spectrum of an optical signal output from the transmit photonic integrated circuit shown in FIG. 5a;

FIGS. 5d and 5e illustrates plots of bit error rate (BER) and Q Factor, respectively, as a function of subcarrier power ratios;

DESCRIPTION OF THE EMBODIMENTS

Consistent with the present disclosure, an optical communication system is provided in which data is carried over optical signals including subcarriers. The subcarriers may be modulated with the standard modulation formats noted above, but the modulation formats are selectively assigned to the subcarriers, such that some subcarriers are modulated with different standard modulation formats than others. As used herein, a "standard modulation format" is one of BPSK, and n-QAM, where n is an integer. Such n-QAM modulation formats include of 3-QAM, 4-QAM (QPSK), 8-QAM, 16-QAM, 64-QAM, 128-QAM, and 256-QAM. By selecting the number of subcarriers and the types of modulation formats employed, an optical signal with an effective SE that is between that of the standard modulation formats can be generated for transmission over a distances that more closely matches the link distance. Such custom or intermediate SE signals can be tailored to a particular optical link SNR to provide data transmission rates that are higher than the low order modulation formats that would otherwise be employed for optical signals carried by such links. As a result, more efficient data transmission can be achieved.

Various circuits and techniques for generating and processing optical signals including subcarriers are described in the following: U.S. Patent Application Publication No. 2014/0092924 titled "Channel Carrying Multiplexed Digital Subcarriers"; U.S. Patent Application Publication No. 2015/0280834 titled "Frequency And Phase Compensation For Modulation Formats Using Multiple Sub-Carriers"; U.S. Patent Application Publication No. 2015/0280853, titled "Configurable Frequency Domain Equalizer for Dispersion Compensation of Multiple Sub-Carriers"; U.S. patent application Ser. No. 14/788,564, filed Jun. 30, 2015, and titled "Feedback Carrier Recovery Device"; and U.S. patent application Ser. No. 14/754,521, filed Jun. 29, 2015, and titled "Frequency Domain Coded Modulation With Polarization Interleaving For Fiber Nonlinearity Mitigation In Digital Sub-Carrier Coherent Optical Communication Systems." The entire contents of each of the foregoing are incorporated herein by reference. Reference will now be made in detail to the present exemplary embodiments of the present disclosure, which are illustrated in the accompanying drawings. Wherever possible, the same reference numbers will be used throughout the drawings to refer to the same or like parts.

Figure 1:
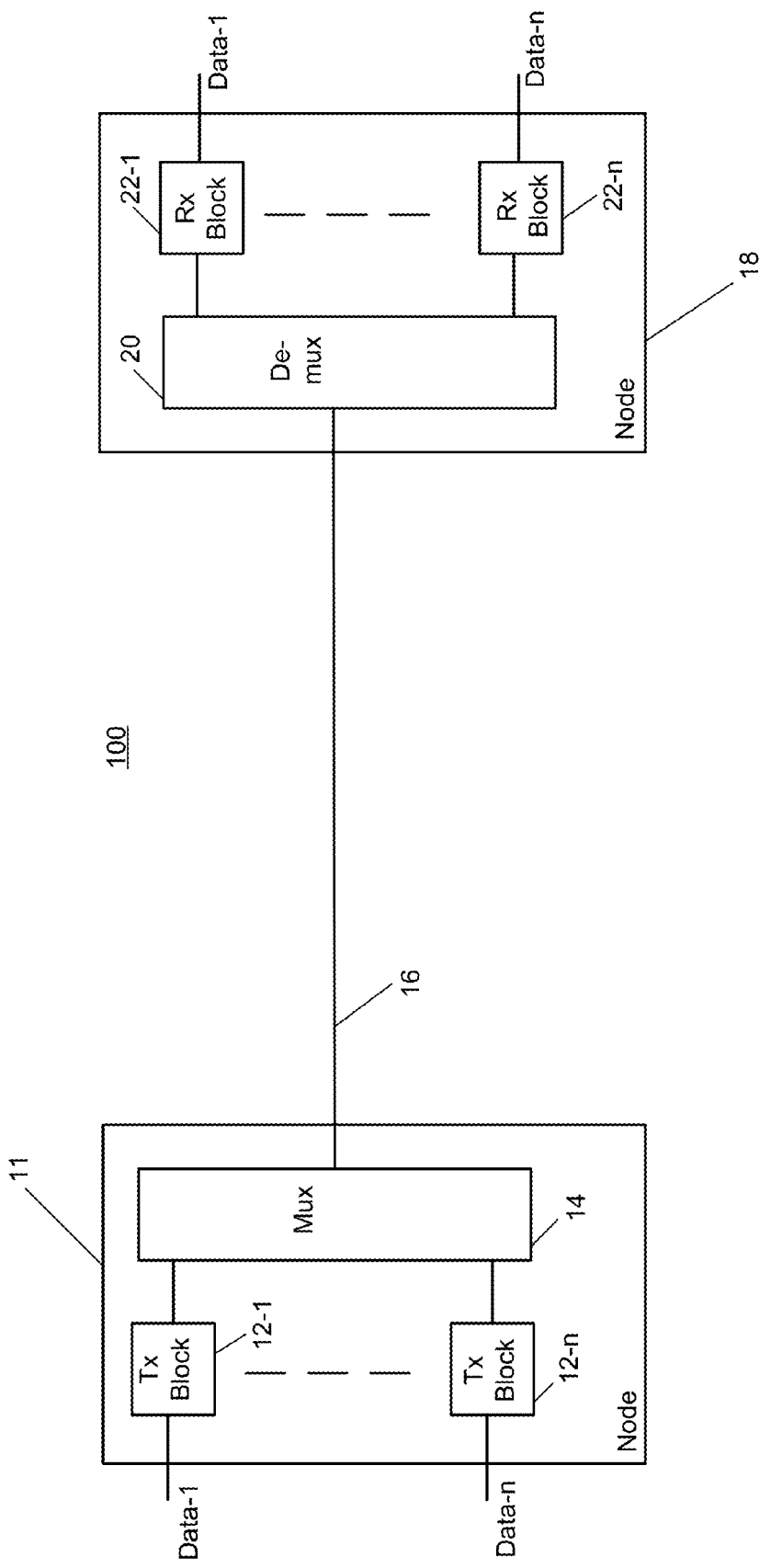
FIG. 1 illustrates a block diagram of an optical communication system consistent with an aspect of the present disclosure.

FIG. 1 illustrates an optical link of optical communication system 100 consistent with an aspect of the present disclosure. Optical communication system 100 includes a plurality of transmitter blocks (Tx Block) 12-1 to 12-n provided in a transmit node 11. Each of transmitter blocks 12-1 to 12-n receives a corresponding one of a plurality of data or information streams Data-1 to Data-n, and, in response to a respective one of these data streams, each of transmitter blocks 12-1 to 12-n may output a group of optical signals or channels to a combiner or multiplexer 14. Each optical signal carries an information stream or data corresponding to each of data streams Data-1 to Data-n. Multiplexer 14, which may include one or more optical filters, for example, combines each of group of optical signals onto optical communication path 16. Optical communication path 16 may include one or more segments of optical fiber and optical amplifiers, for example, to optically amplify or boost the power of the transmitted optical signals.

As further shown in FIG. 1, a receive node 18 is provided that includes an optical combiner or demultiplexer 20, which may include one or more optical filters, for example, optical demultiplexer 20 supplies each group of received optical signals to a corresponding one of receiver blocks (Rx Blocks) 22-1 to 22-n. Each of receiver blocks 22-1 to 22-n, in turn, supplies a corresponding copy of data or information streams Data-1 to Data-n in response to the optical signals. It is understood that each of transmitter blocks 12-1 to 12-n has the same or similar structure and each of receiver blocks 22-1 to 22-n has the same or similar structure.

Figure 2:
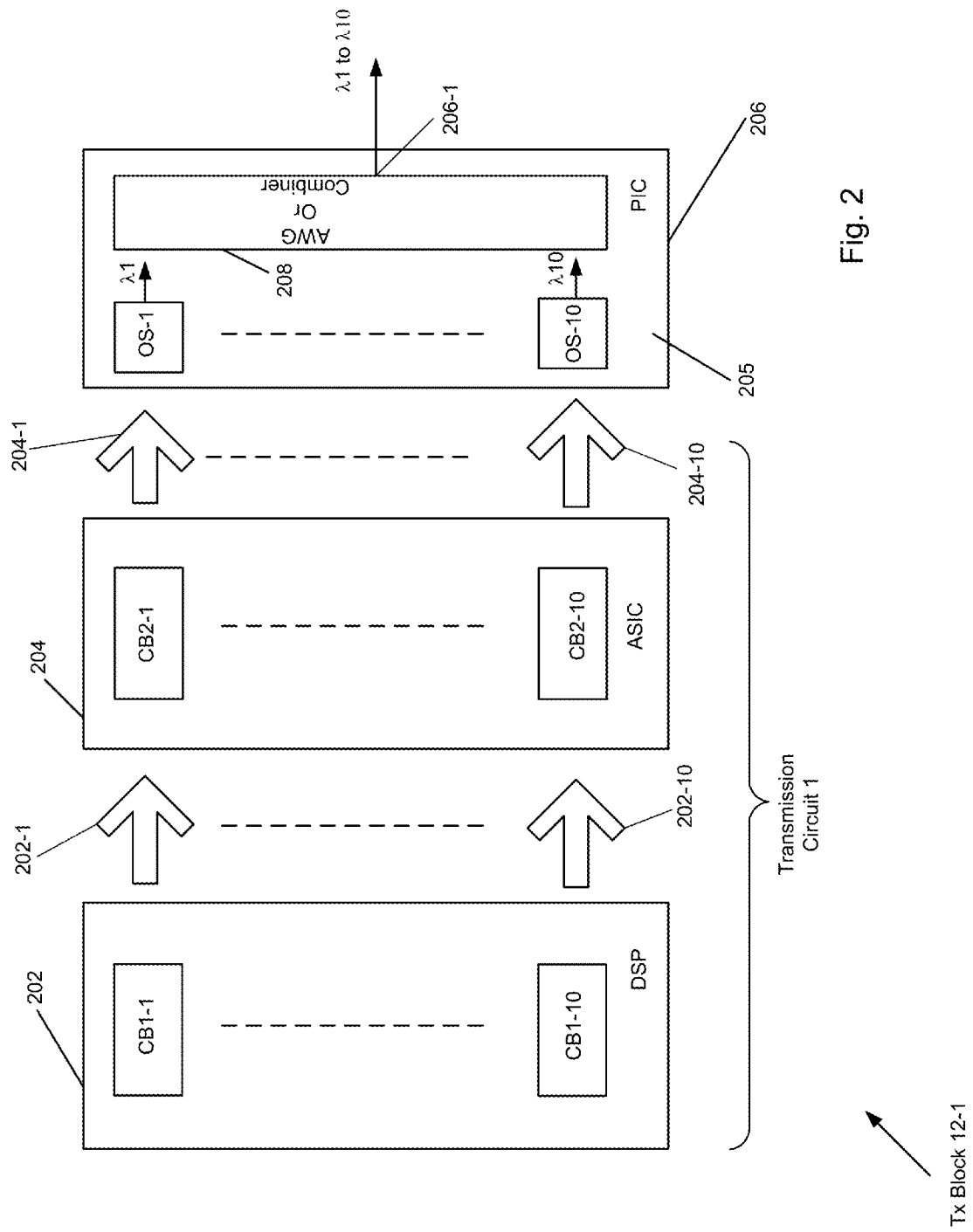
FIG. 2 illustrates a diagram of a transmit block, including a transmission circuit, consistent with an additional aspect of the present disclosure.

FIG. 2 illustrates one of transmitter blocks 12-1 in greater detail. Transmitter block 12-1 may include a digital signal processor (DSP) 202 including circuitry or circuit blocks CB1-1 to CB1-10, each of which receiving, for example, a corresponding portion of Data-1 and supplying a corresponding one of outputs or electrical signals 202-1 to 202-10 to a circuit, such as application specific integrated circuit (ASIC) 204. ASIC 204 include circuit blocks CB2-1 to CB2-10, which supply corresponding outputs or electrical signals 204-1 to 204-10 to optical sources or transmitters OS-1 to OS-2 provided on transmit photonic integrated circuit (PIC) 205. As further shown in FIG. 2, each of optical sources OS-1 to OS-2 supplies a corresponding one of modulated optical signals having wavelengths $\lambda 1$ to $\lambda 10$, respectively. The optical signals are combined by an optical combiner or multiplexer, such as arrayed waveguide grating (AWG) 208, for example, and combined into a band or group of optical signals supplied by output 206-1. Alternatively, a known optical power multiplexer may be provided to combine the optical signals. Optical sources OS-1 to OS-10 and multiplexer 208 may be provided on substrate 205, for example. Substrate 205 may include indium phosphide or other semiconductor materials. Although FIG. 2 illustrates ten circuit blocks CB1-1 to CB1-10, ten circuit blocks CB2-1 to CB2-10, and ten optical sources OS1-1 to OS-10, it is understood that any appropriate number of such circuit blocks and optical sources may be provided. Moreover, it is understood, that optical sources OS-1 to OS-10, as well as multiplexer 208, may be provided as discrete components, as opposed to being integrated onto substrate 205 as PIC 206. Alternatively, selected components may be provided on a first substrate while others may be provided on one or more additional substrates in a hybrid scheme in which the components are neither integrated onto one substrate nor provided as discrete devices.

DSP and ASIC 202 collectively constitute transmission circuit 1 that supply drive signals (electrical signals) to the modulators in optical source OS-1 as well as the remaining optical sources.

Figure 3A:
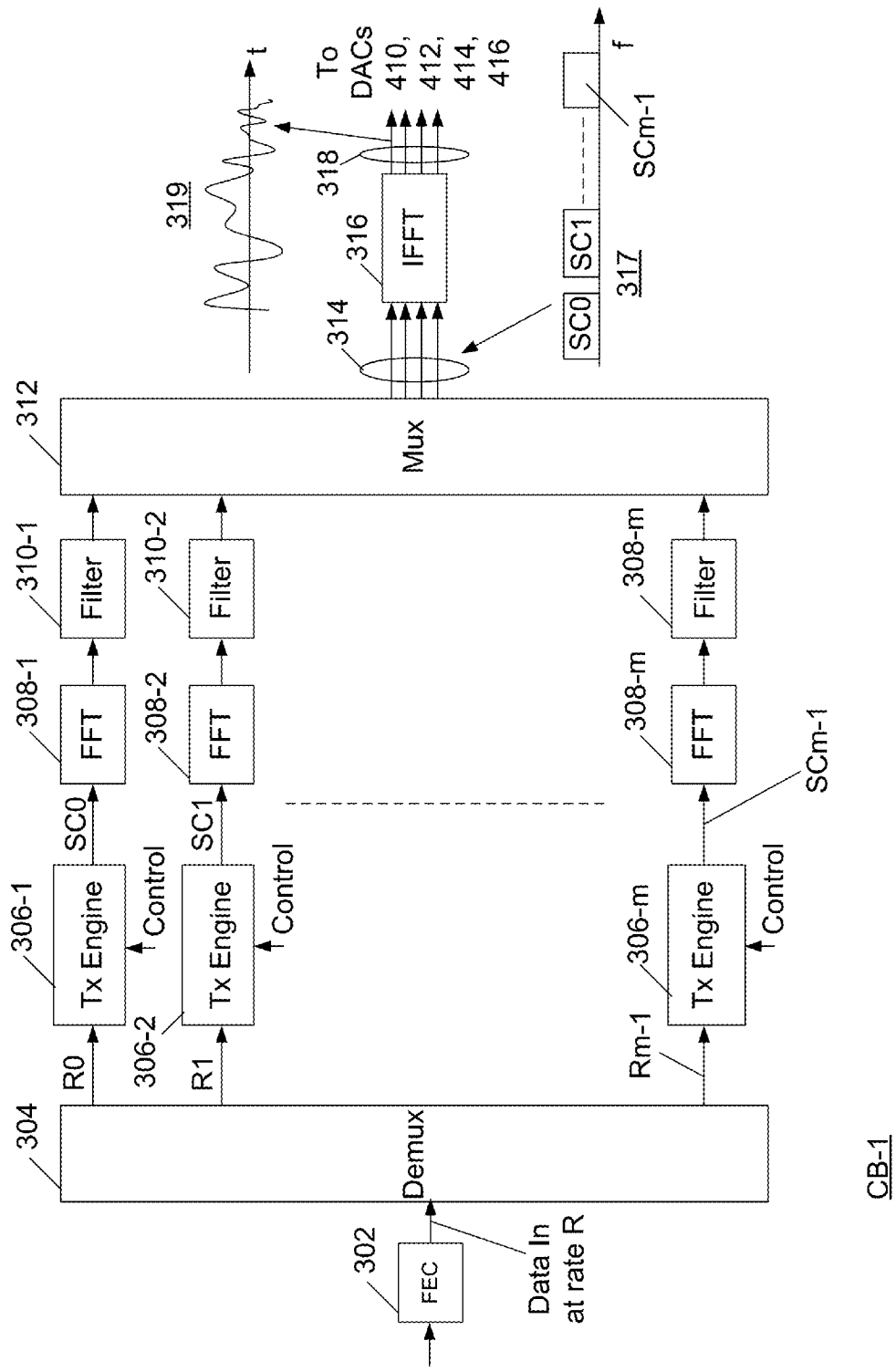
FIG. 3a illustrates a first portion of the transmission circuit in greater detail.

FIG. 3a illustrates a portion of transmission circuit 1, namely, circuit block CB1-1 of DSP 202 in greater detail. Circuit block CB-1 includes a Forward Error Correction (FEC) encoder 302 that receives data stream Data-1 and encodes the data stream to provide input data Data In at a rate R. The same FEC encoder engine is used to encode data associated with each subcarrier. Data In is supplied to demultiplexer circuit 304 which includes a plurality of switches that supply portions of Data In at respective rates R0 to Rm−1 to a corresponding one of engine circuits 306-1 to 306-*m*. Typically, the average of R0 to Rm−1 (namely, (R0+Rm−1)/m) is equal to rate R.

Each engine circuit (collectively referred to as "306") supplies a digitized analog signal (SC0 to SCm−1) that is representative of a respective one of a plurality of subcarriers of an optical signal which is ultimately output from an optical source, as discussed in greater detail below. Each of the digitized analog signals is next fed to a corresponding one of fast Fourier transform (FFT) circuits 308-1 to 308-m to convert each such signal into a respective frequency domain signal. Each frequency domain signal is then subject to filtering by a corresponding one of filters 310-1 to 310-m. In one example, a power associated with each frequency domain signal is adjusted for optimal performance to provide greater energy or power to high order modulation format subcarriers which may be more prone to errors and less power to low order modulation format subcarriers which are less susceptible to errors. Put another way, particular powers are assigned to each subcarrier, such that the average bit error rate (BER) of all subcarriers is optimized to have a lowest value possible. That is, each higher order subcarrier and each lower order subcarrier, for example, has a respective one of a plurality of bit error rates (BERs). The average BER, i.e., an average of the BERs over all the high and lower order subcarriers, has a lower value than if the powers of the subcarriers were not optimized as described above. Such minimum average BER can be obtained when the BER of each subcarrier is substantially the same or uniform.

In one example, digitized analog signals corresponding to lower order modulation formats, such as BPSK, preferably have an associated power that is less than a power associated with digitized analog signals corresponding to higher order modulation format, such as 8-QAM. The filtered or power adjusted frequency domain signals are next input to a multiplexer 312 that distributes the power adjusted frequency domain signals over each of four outputs 314. These frequency domain signals are then converted back to the time domain by inverse fast Fourier transform circuit (IFFT) 316 and, the resulting time domain signals are next supplied on outputs 318, each of which being coupled or connected to a respective one of digital to analog converters (DACs) 410, 412, 414, and 416. Spectrum 317 is a representation of digitized analog subcarrier signals SC0 to SCm−1 in the frequency domain prior to input to IFFT 316, and output waveform 319 form IFFT 316 is a representation of the subcarrier signals in the time domain.

As further shown FIG. 3*a*, each of the Tx Engine circuits receives a corresponding one of a plurality of control signals. Selection of a desired modulation format by the Tx Engine circuits will next be described with reference to FIG. 3*b*, which shows Tx Engine circuit 306-1 in greater detail. Remaining Tx Engine circuits 306-2 to 306*m*−1 have the same or similar structure as Tx Engine circuit 306-1.

Figure 3B:
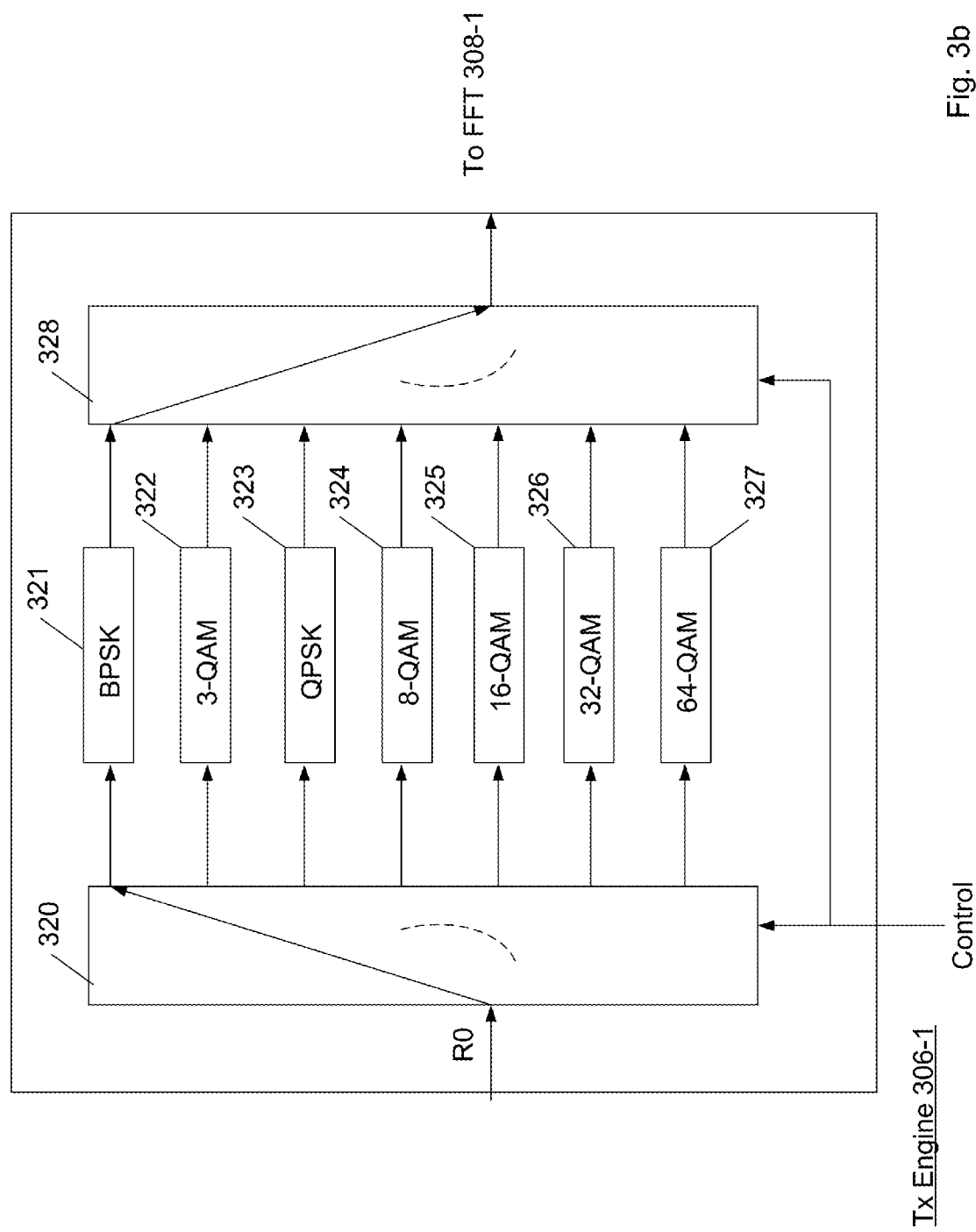
FIG. 3b illustrates a Tx Engine circuit of FIG. 3a in greater detail.

As shown in FIG. 3*b*, a control signal may be supplied to switch 320, which may be implemented in either firmware or software. In response to the control signal one, switch 320 directs the data to one of modulation format circuit 321 to 327, and the selected modulation format circuit is activated to supply a digitized analog signal associated with a selected modulation format, which in this example, is one of BPSK, 3-QAM, QPSK, 8-QAM, 16-QAM, 32, QAM, and 64-QAM). The control signal may further be employed to control switch 328 to direct the digitized analog signal to FFT 308-1 from the selected one of modulation format circuits 321 to 327. Accordingly, for example, if an optical link has a particular SNR which causes a given number of bit errors to occur during propagation along the length of the link, a combination of subcarrier modulation formats can be selected, such that the effective BER associated with an optical signal carrying such subcarriers approximates the BER of the link, and thus the transmission distance of an optical signal including such subcarriers more closely approximates the link distance. As such, an intermediate SE that provides maximum data transmission rate can be obtained for the link. As noted above, in the conventional approach, a standard transmission format would be employed for such link having a low SE that yields a capacity that is less than that associated with the intermediate SE described above. An expression for determining an intermediate SE of an optical signal including m subcarriers will next be presented. If M is the total number of subcarriers, A is the number of subcarriers with modulation format 1, SE=X1 for modulation format 1, B is the number of subcarriers with modulation format 2, and SE=X2 for modulation format Y, an average SE (SEavg) of the optical signal satisfies: SEavg=(A/M)*X1+(B/M)*X2 (Eq. 1), where M is a sum of A+B, A being a number of the first plurality of subcarriers and B being a number of the second plurality of subcarriers. Accordingly, there are M−1 additional SEs between the two available ones (X1 and X2). Such additional SEs can be realized without complex hardware requiring high gate counts or a higher power in implementation.

The above expression for SEavg is for when there are two modulation formats. A general expression for the average SE is: SEavg=(A1/M)*X1+(A2/M)*X2+(A3/M)*X3+ . . . (An/M)*Xn, (Eq. 2) where M is the total number of subcarriers, A1 is the number of subcarriers with modulation format 1, SE=X1 for modulation format 1, A2 is the number of subcarriers with modulation format 2, SE=X2 for modulation format 2, etc., An is the number of subcarriers with the nth modulation format, and SE=Xn for the nth modulation format. Put another way, $$SEavg = \frac{1}{M} \sum_{n=1}^{M} Xn. \quad \text{(Eq. 3)}$$

If all the subcarriers are passed to one single FEC circuit, as noted above, the equivalent BER is the mean BER of all the different subcarriers.

Figure 4:
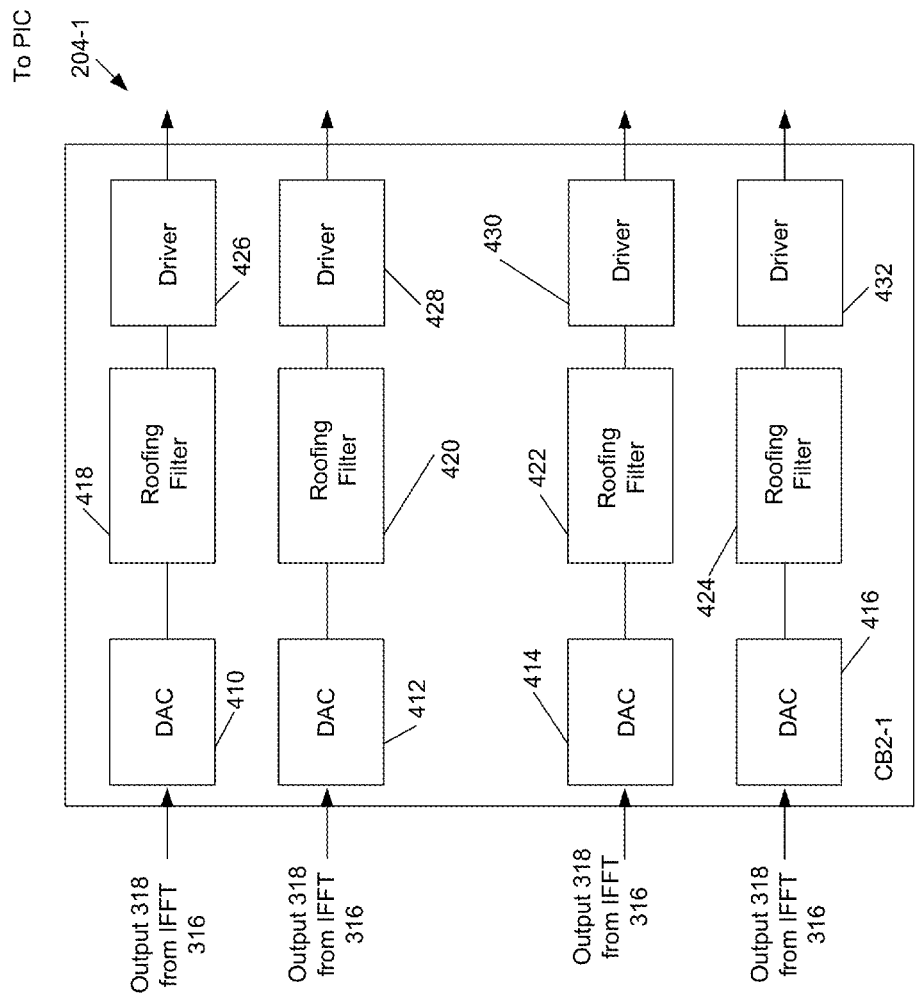
FIG. 4 illustrates a second portion of the transmission circuit in greater detail.

Turning to FIG. 4, DACs 410 and 412 receive a respective one of a pair of the outputs 318 from IFFT 316. DACs 410 and 412, in turn, output corresponding analog signals, which are filtered by low-pass or roofing filters 418 and 420 to thereby remove, block or substantially attenuate higher frequency components in these analog signals. Such high frequency components or harmonics are associated with sampling performed by DACs 410 and 412 and are attributable to known "aliasing." The analog signals output from DACs 414 and 416 are similarly filtered by roofing filters 422 and 424, respectively. The filtered analog signals output from roofing filters 418, 420 422, and 424 may next be fed to corresponding driver circuits 426, 428, 430, and 432, which supply modulator driver signals that have a desired current and/or voltage for driving modulators present in PIC 206 to provide optical signals with the desired subcarriers noted above. PIC 206 is discussed in greater detail below with reference to FIG. 5a.

Figure 5A:
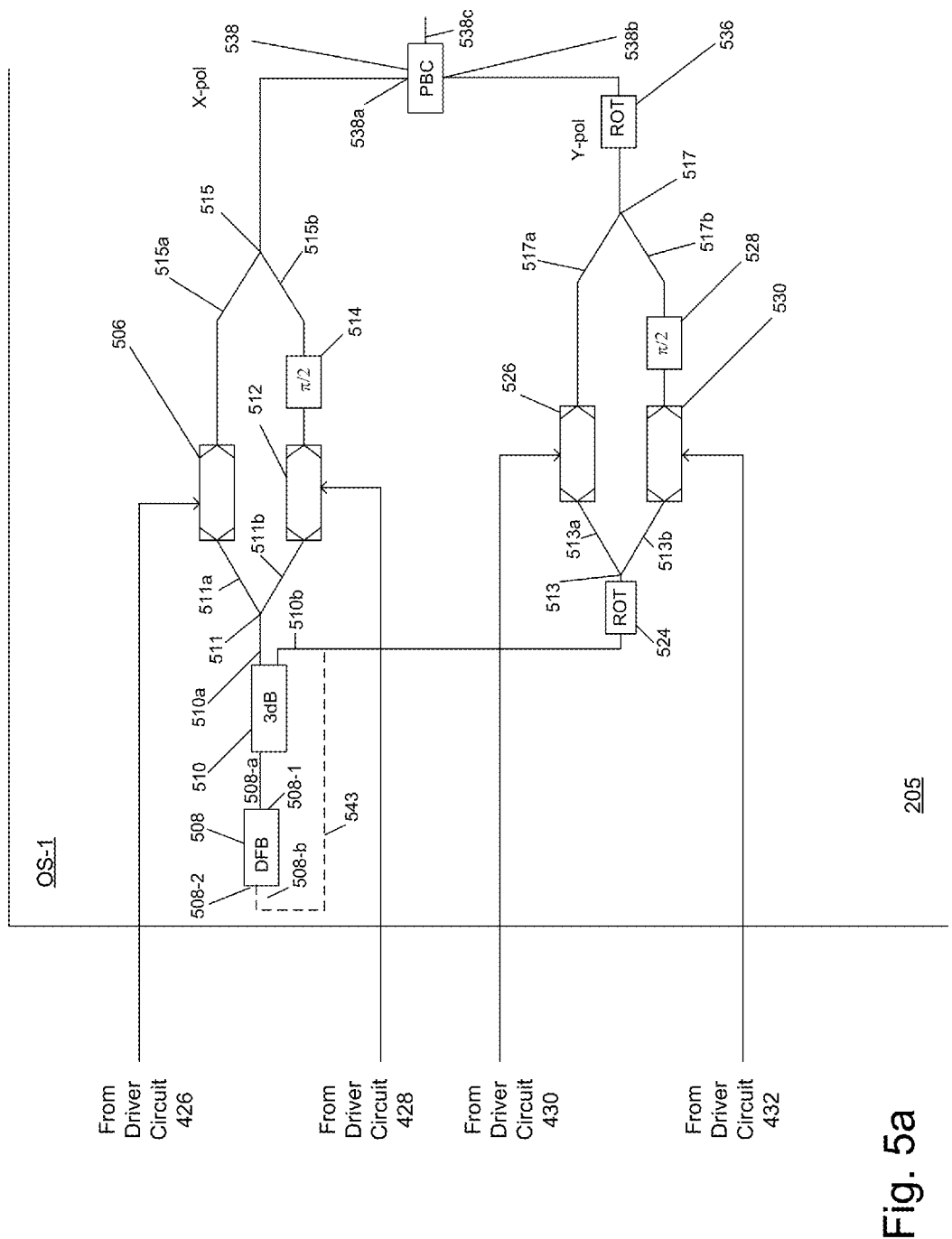
FIG. 5a illustrates a portion of transmit photonic integrated circuit consistent with the present disclosure.

FIG. 5a illustrates transmitter or optical source OS-1 in greater detail. It is understood that remaining optical sources OS-1 to OS-10 have the same or similar structure as optical source OS-1.

Optical source OS-1 may be provided on substrate 205 and may include a laser 508, such as a distributed feedback laser (DFB) that supplies light to at least four (4) modulators 506, 512, 526 and 530. DFB 508 may output continuous wave (CW) light at wavelength λ1 to a dual output splitter or coupler 510 (e.g. a 3 db coupler) having an input port and first and second output ports. Typically, the waveguides used to connect the various components of optical source OS-1 may be polarization dependent. A first output 510a of coupler 510 supplies the CW light to first branching unit 511 and the second output 510b supplies the CW light to second branching unit 513. A first output 511a of branching unit 511 is coupled to modulator 506 and a second output 511b is coupled to modulator 512. Similarly, first output 513a is coupled to modulator 526 and second output 513b is coupled to modulator 530. Modulators 506, 512, 526 and 530 may be, for example, Mach Zehnder (MZ) modulators. Each of the MZ modulators receives CW light from DFB 508 and splits the light between two (2) arms or paths. An applied electric field in one or both paths of a MZ modulator creates a change in the refractive index to induce phase and/or amplitude modulation to light passing through the modulator. Each of the MZ modulators 506, 512, 526 and 530, which collectively can constitute a nested modulator, are driven with data signals or drive signals supplied via driver circuits 426, 428, 430, and 432, respectively. The CW light supplied to MZ modulator 506 via DFB 508 and branching unit 511 is modulated in accordance with the drive signal supplied by driver circuit 426. The modulated optical signal from MZ modulator 506 is supplied to first input 515a of branching unit 515. Similarly, driver circuit 328 supplies further drive signals for driving MZ modulator 512. The CW light supplied to MZ modulator 512 via DFB 508 and branching unit 511 is modulated in accordance with the drive signal supplied by driver circuit 428. The modulated optical signal from MZ modulator 512 is supplied to phase shifter 514 which shifts the phase of the signal 90° ($\pi/2$) to generate one of an in-phase (I) or quadrature (Q) components, which is supplied to second input 515b of branching unit 515. The modulated data signals from MZ modulator 506, which include the remaining one of the I and Q components, and the modulated data signals from MZ modulator 512, are supplied to polarization beam combiner (PBC) 538 via branching unit 515.

Modulator driver 430 supplies a third drive signal for driving MZ modulator 526. MZ modulator 526, in turn, outputs a modulated optical signal as either the I component or the Q component. A polarization rotator 524 may optionally be disposed between coupler 510 and branching unit 513. Polarization rotator 524 may be a two port device that rotates the polarization of light propagating through the device by a particular angle, usually an odd multiple of 90°. The CW light supplied from DFB 508 is rotated by polarization rotator 524 and is supplied to MZ modulator 526 via first output 513a of branching unit 513. MZ modulator 526 then modulates the polarization rotated CW light supplied by DFB 508, in accordance with drive signals from driver circuit 430. The modulated optical signal from MZ modulator 526 is supplied to first input 517a of branching unit 517.

A fourth drive signal is supplied by driver 432 for driving MZ modulator 530. The CW light supplied from DFB 508 is also rotated by polarization rotator 524 and is supplied to MZ modulator 530 via second output 513b of branching unit 513. MZ modulator 530 then modulates the received optical signal in accordance with the drive signal supplied by driver 432. The modulated data signal from MZ modulator 530 is supplied to phase shifter 528 which shifts the phase the incoming signal 90° ($\pi/2$) and supplies the other of the I and Q components to second input 517b of branching unit 517. Alternatively, polarization rotator 536 may be disposed between branching unit 517 and PBC 538 and replaces rotator 524. In that case, the polarization rotator 536 rotates both the modulated signals from MZ modulators 526 and 530 rather than the CW signal from DFB 508 before modulation. The modulated data signal from MZ modulator 526 is supplied to first input port 538a of polarization beam combiner (PBC) 538. The modulated data signal from MZ modulator 530 is supplied to second input port 538b of polarization beam combiner (PBC) 538. PBC 538 combines the four modulated optical signals from branching units 515 and 517 and outputs a multiplexed optical signal having wavelength λ1 to output port 538c. In this manner, one DFB laser 508 may provide a CW signal to four separate MZ modulators 506, 512, 526 and 530 for modulating at least four separate optical channels by utilizing phase shifting and polarization rotation of the transmission signals. Although rotator 536 and PBC 538 are shown on the PIC, it is understood that these devices may instead be provided off-PIC.

In another example, splitter or coupler 510 may be omitted and DFB 508 may be configured as a dual output laser source to provide CW light to each of the MZ modulators 506, 512, 526 and 530 via branching units 511 and 513. In particular, coupler 510 may be replaced by DFB 508 configured as a back facet output device. Both outputs of DFB laser 508, from respective sides 508-1 and 508-2 of DFB 508, are used, in this example, to realize a dual output signal source. A first output 508a of DFB 508 supplies CW light to branching unit 511 connected to MZ modulators 506 and 512. The back facet or second output 508b of DFB 508 supplies CW light to branching unit 513 connected to MZ modulators 526 and 530 via path or waveguide 543 (represented as a dashed line in FIG. 5a). The dual output configuration provides sufficient power to the respective MZ modulators at a power loss far less than that experienced through 3 dB coupler 510. The CW light supplied from second output 508b is supplied to waveguide 543 which is either coupled directly to branching unit 513 or to polarization rotator 524 disposed between DFB 508 and branching unit 513. Polarization rotator 524 rotates the polarization of CW light supplied from second output 508b of DFB 508 and supplies the rotated light to MZ modulator 526 via first output 513a of branching unit 513 and to MZ modulator 530 via second output 513b of branching unit 513. Alternatively, as noted above, polarization rotator 524 may be replaced by polarization rotator 536 disposed between branching unit 517 and PBC 538. In that case, polarization rotator 536 rotates both the modulated signals from MZ modulators 526 and 530 rather than the CW signal from back facet output 508b of DFB 508 before modulation.

The polarization multiplexed output from PBC 538, may be supplied to multiplexer 208 in FIG. 2, along with the polarization multiplexed outputs having wavelength λ2 to λ10 from remaining optical sources OS-2 to OS-m. Multiplexer 208, which, as noted above, may include an AWG 204, supplies a group of optical signals to multiplexer 14

(see FIG. 1). It is understood that PICS present in transmitter blocks 12-2 to 12-n operate in a similar fashion and include similar structure as PIC 206 shown in FIGS. 2 and 5 to provide optical signal including subcarriers having different modulation formats to provide a desired SE, as noted above.

Thus, by selecting digitized analog signal corresponding different modulation formats by applying appropriate control signals to Tx Engines 306-1 to 306-m, respective drive signals are applied to the nested MZ modulator shown in FIG. 5a, such that an optical signal including subcarriers modulated in accordance with the modulation formats associated with the selected digitized analog signals is output from the PIC. The optical signal thus generated also has a desired SE, as noted above. As further noted above, in one example, certain subcarriers may have a first modulation format while others have a second modulation format in response to first control signals. Consistent with an aspect of the present invention, the first and second modulation formats are different from one another and are selected from the group of standard modulation formats: BPSK and n-QAM, where n is an integer greater than 1, such that n-QAM modulation formats includes 3QAM, 4QAM (QPSK), 8QAM, 16QAM, 32QAM, 64-QAM, 128-QAM, and 256-QAM. In another aspect of the present disclosure, the first modulation format is an N-QAM modulation format, where N is a first integer, and the second modulation format is an M-QAM modulation format, where M is a second integer that is less than the first integer. The number of subcarriers, such as SC0 to SCm−1, having the first modulation format may be the same or different than the number of subcarriers having the second modulation format. Consistent with an additional aspect of the present disclosure, third and fourth control signals may also be applied to the Tx Engines 306-1 to 306-m so that third and fourth modulation formats may be applied to third and fourth groups of the subcarrier. Here also, the third and fourth modulation formats may be selected from the standard modulation formats, and number of subcarriers in the third group may be the same or different than the number of subcarriers in the fourth group. In addition, the third and fourth modulation formats may be different from one another, as well as different from the first and second modulation formats. Further, the subcarriers may include first, second, third and fourth groups of subcarriers having different modulation formats from one another based on appropriate application of control signals. It is understood, that the combinations of modulation formats discussed above is exemplary only, and that any appropriate combination of modulation formats and number of subcarriers can be employed.

Figure 5B:
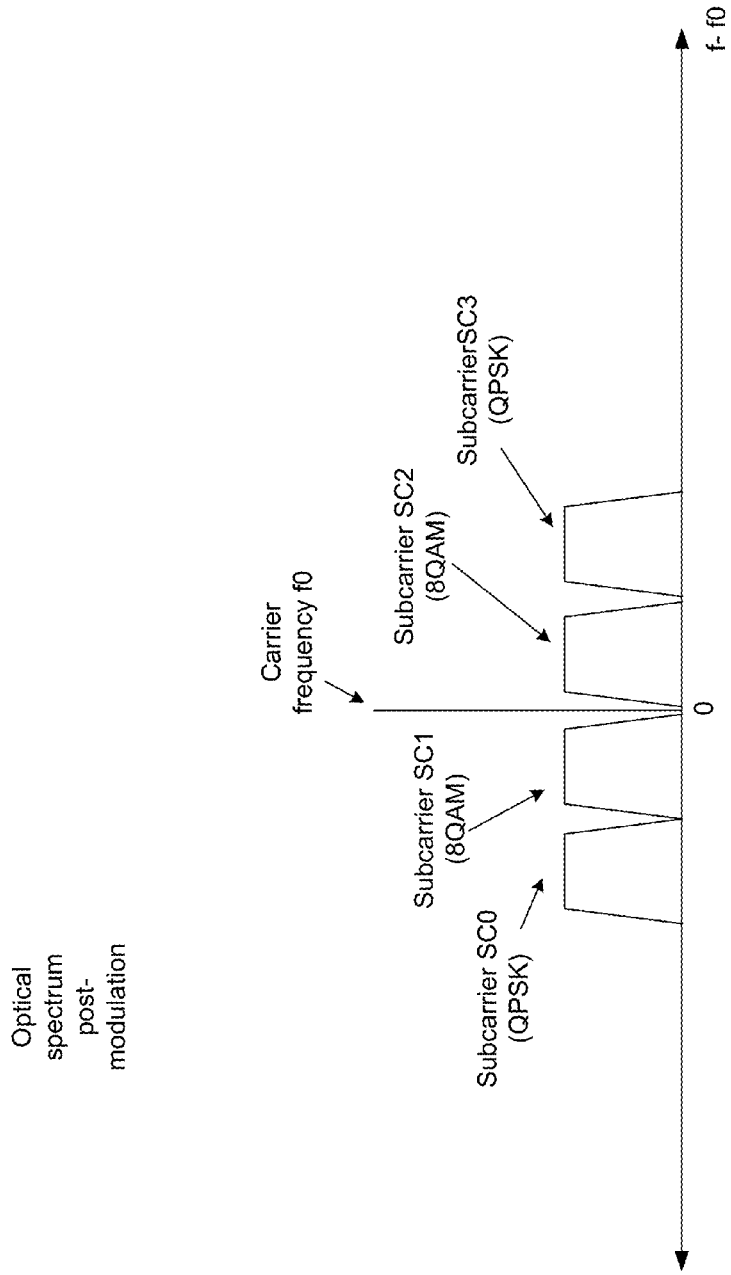

FIG. 5b illustrates an examples of a spectrum associated with an optical signal output from optical source OS-1. Here, the optical signal includes four subcarriers (SC0-SC3). Subcarriers SC0 and SC3 may have a first modulation format, such as, QPSK, and second subcarriers, such as subcarriers SC1 and SC2, may have a second modulation format, such as 8QAM to provide an effective or average SE that is between that associated with QPSK and 8QAM. As generally understood, subcarriers may be generated by modulating a carrier frequency (e.g., f0 in FIG. 5b having a zero baseband frequency), which is the frequency of the light output from the laser to the modulator discussed above with reference to FIG. 5a, as opposed to modulating individual carriers supplied from respective lasers. In addition, subcarriers associated with the same carrier frequency may be encoded with a common or shared FEC encoder engine or circuit, as well as decoded with a shared FEC decoder engine or circuit.

Figure 5C:
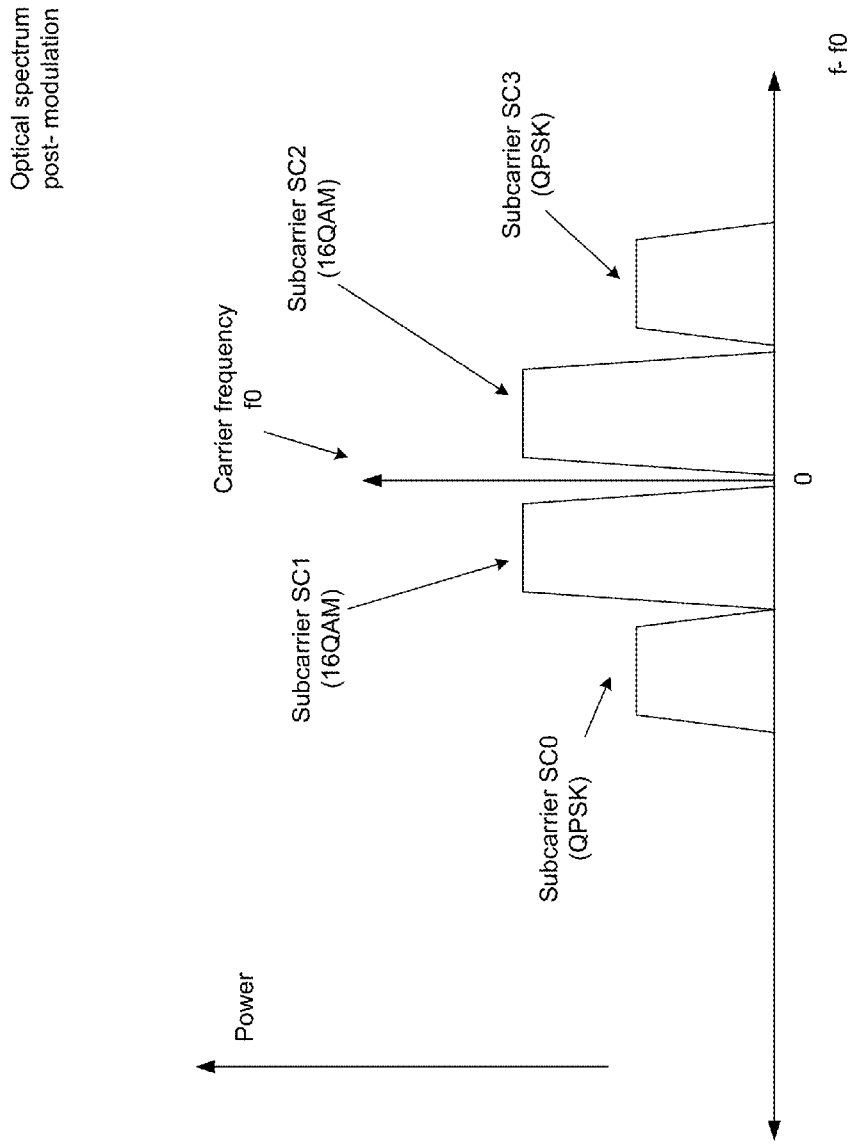
FIG. 5c illustrates a spectrum of another optical signal output from the transmit photonic integrated circuit shown in FIG. 5a in which the powers of individual sub-carriers are non-uniform.

FIG. 5c illustrates an example in which power of certain subcarrier has been adjusted to optimize or obtain a lowest average bit error rate (BER) for a particular combination of subcarriers and modulation formats. In this example, inner subcarriers SC1 and SC2 are modulated in accordance with a 16QAM modulation format, and outer subcarriers SC0 and SC3 are modulated in accordance with a QPSK modulation format. As shown in FIG. 5c, inner subcarriers having a higher order modulation format have a higher power, in this example, relative to the outer subcarriers. It is understood, however, that various devices described herein may impart excessive loss or noise, for example, even to subcarriers having a lower order modulation format. In such instances, such subcarriers having a lower order modulation format may have a power that exceeds that of subcarriers having a higher order modulation format and transmitted with the lower order modulation format subcarriers.

In another example, the following modulation formats and corresponding SEs are available for polarization multiplexed (PM) subcarriers: PM-BPSK(SE=2), PM-3QAM (SE=3), PM-QPSK(SE=4), PM-8QAM(SE=6), and PM-16QAM(SE =8). Various combinations of subcarriers modulated in accordance with two or more of these modulation formats can yield optical signals that can have one of (12) SEs without extra hardware or power. The optical signal SE (obtained from particular combinations of subcarrier modulation formats) can be selected from one of: 2.25 2.5 2.75 3.25 3.5 3.75 4.5 5 5.5 6.5 7 7.5. These SE values are calculated based on the SE expression noted above.

An example of power optimization of the subcarriers shown in FIG. 5c will next be described with reference to FIGS. 5d and 5e. Preferably, a ratio of the power of the subcarriers having a first modulation format, such as 8QAM, to the power of the subcarriers having a second modulation format, such as QPSK, is adjusted so that the average BER (BERavg) of the optical signal is at a minimum (see FIG. 5d, which shows the Optimum Power Ratio and corresponding Minimum BER). It is noted that for a fixed total power for the optical signal, at lower power ratios, such as at 0 dB, the power of 8QAM subcarriers is the same as the QPSK subcarriers, resulting in the 8QAM subcarriers having a higher BER. Accordingly, the average BER is higher for such low power ratios. On the other hand, if the power ratio is high (to the right in FIG. 5d), the 8QAM subcarriers have high power and the QPSK subcarriers have relatively low power. As such, the QPSK subcarriers incur a significant number of bit errors, and the average BER is high under these circumstances as well. In one example, the optimum power ratio may be 3.7 dB and, in another example, the optimum power ratio is 3.3 dB. As noted above, the system SNR may impact the optimum power ratio.

Put another way, the modulator is capable of outputting each of the n pluralities of subcarriers (n being greater than 1) at a plurality of powers, such that the modulator supplies a first one of the plurality of n pluralities of subcarriers at a first one of the plurality of powers and a second one of the n pluralities of subcarriers at a second one of the plurality of powers. A ratio of the first and second powers is one of a plurality of ratios of each of the plurality of powers to one another and is associated with a Q value of the optical signal that is greater than Q values associated with remaining ones of the plurality of ratios, or an average BER that is less than an average BER associated with remaining ones of the plurality of ratios.

Preferably, the modulator is controlled to output an optical signal with subcarriers having power levels and a corresponding power ratio that yields a minimum BERavg.

In one example, BERavg satisfies:

$$BERavg = \frac{1}{\sum_{n=1}^{M} Xn} \sum_{n=1}^{M} Xn \cdot BERn \quad \text{(Eq. 4)}$$

where BERn is the bit error rate of subcarriers having the nth modulation format, and Xn, as noted above, is the spectral efficiency of such nth modulation format. In a case in which first and second pluralities of subcarriers are provided, each such plurality being modulated in accordance with first and second modulation formats, respectively, Eq. 4 can be written as:

$$BERavg=[X1*BER1+X2*BER2]/(X1+X2) \quad \text{(Eq. 5)}$$

where BER1 and BER2 are the bit error rates of the first and second pluralities of subcarriers, respectively, X1 is the spectral efficiency (SE) of the first modulation format, and X2 is the SE of the second modulation format. In the example discussed above with respect to FIG. 5c in which the first and second subcarriers are modulated based on 8QAM (e.g., first) and QPSK (e.g., second) modulation formats, respectively, BER1 and BER2 are the bit error rates of the polarization multiplexed (PM)-8QAM and PM-QPSK subcarriers, respectively, the spectral efficiency of PM-8QAM is 6, and the spectral efficiency of QPSK or 4. Substituting these values into Equation 5:

$$BERavg=[6*BER1+4*BER2]/(6+4) \quad \text{(Eq. 6)}$$

or $$BERavg=[3*BER1+2*BER2]/5 \quad \text{(Eq. 7)}$$

As generally understood, BER is inversely related to a Quality (Q) Factor. For example, for binary modulation formats, such as BPSK and QPSK, BER=0.5*erfc(Q/√2), where Q (in dB) is 20*Log 10(Q).

Figure 5E:
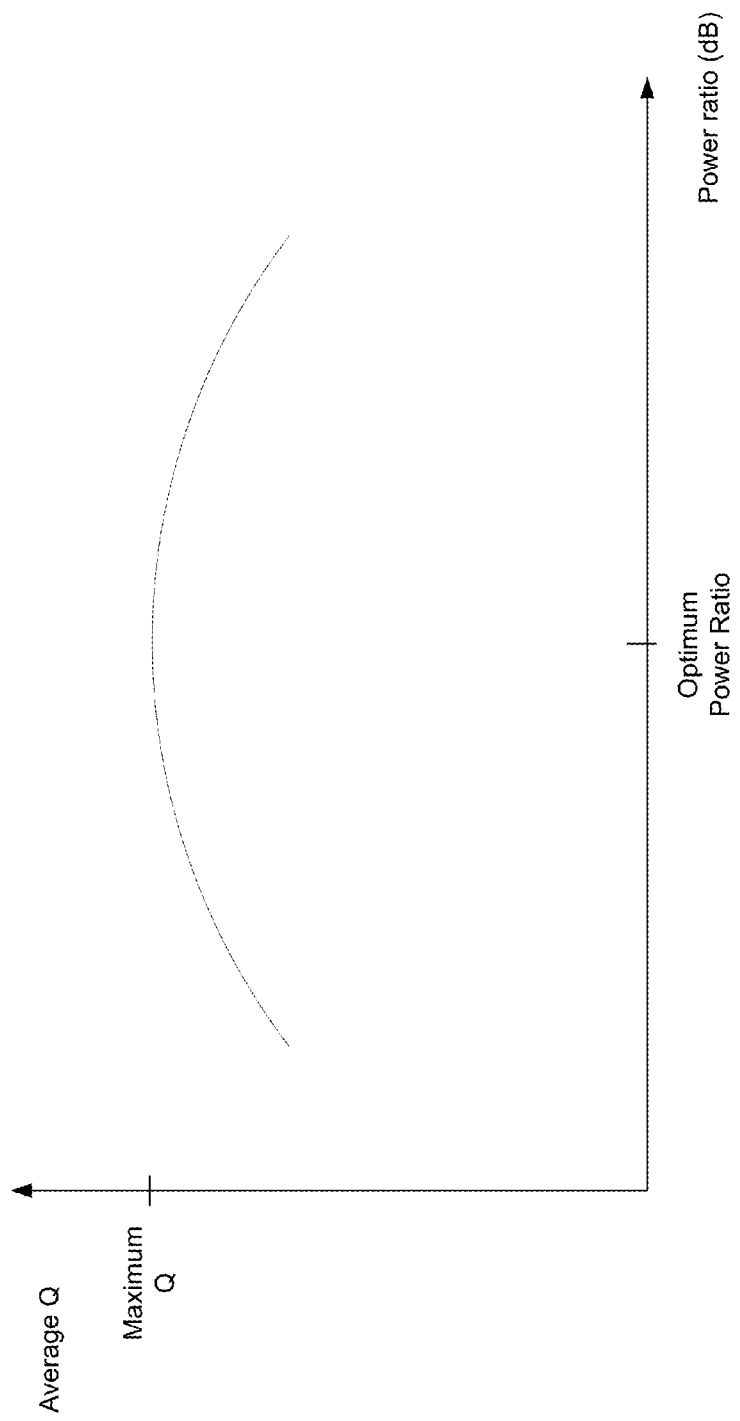

Accordingly, as shown in FIG. 5e, at the optimum power ratio, the Q Factor associated with the optical signal is at a maximum.

In the above examples, a given signal-to-noise ratio (SNR) is assumed. Different SNRs may result in different optimal power ratios and different maximum Q Factors, as well as corresponding minimum values for BERavg.

In another example, minimum BERavg may be obtained when the BER of each individual subcarrier is substantially the same. In addition, the powers of the subcarriers may be set or adjusted so that the BER of each subcarrier is preferably within a range of ±20% of the average BER (BERavg), as calculated in accordance with equations Eq. 4-7. In another example, the powers are selected so that the BER of each subcarrier is more preferably within a range of ±15% of the average BER, and, in another example, the subcarrier powers are such that the BER of each subcarrier is preferably within a range of ±15%. And, in further preferred embodiments, the subcarrier powers are such that the BER of each subcarrier is preferably within a range of ±10% of the average BER and even more preferably within a range of ±5% of the average BER. By adjusting the subcarrier powers to be close to the average BER or close to having the same powers, the average BER is reduced and can approximate the minimum BER. Improved performance can thus be achieved compared to an optical signal in which the BERs fall outside a range of 20% of the average BER, for example. In addition, the powers of the subcarriers discussed above, such as in regard to FIG. 5c, may yield BERs that fall within the above noted 5% to 20% ranges about the average BER.

It is noted that the optical signals disclosed herein are typically not orthogonal frequency division multiplexed (OFDM) optical signals. The spectra of subcarriers in such OFDM optical signals typically overlap with one another (due to modulation based on time-domain rectangular pulses that ensure orthogonality). The subcarriers disclosed herein, however, do not spectrally overlap (due to Nyquist pulse shaping used in generating the subcarriers), as shown in FIGS. 5b and 5c, for example.

As noted above, optical signals output from transmitter block 12-1 are combined with optical signals output from remaining transmitter blocks 12-2 to 12-n onto optical communication path 16 and transmitted to receive node 18 (see FIG. 1). In receive node 18, demultiplexer 20 divides the incomings signal into optical signal groupings, such that each grouping is fed to a corresponding one of receiver blocks 22-1 to 22-n.

Figure 6:
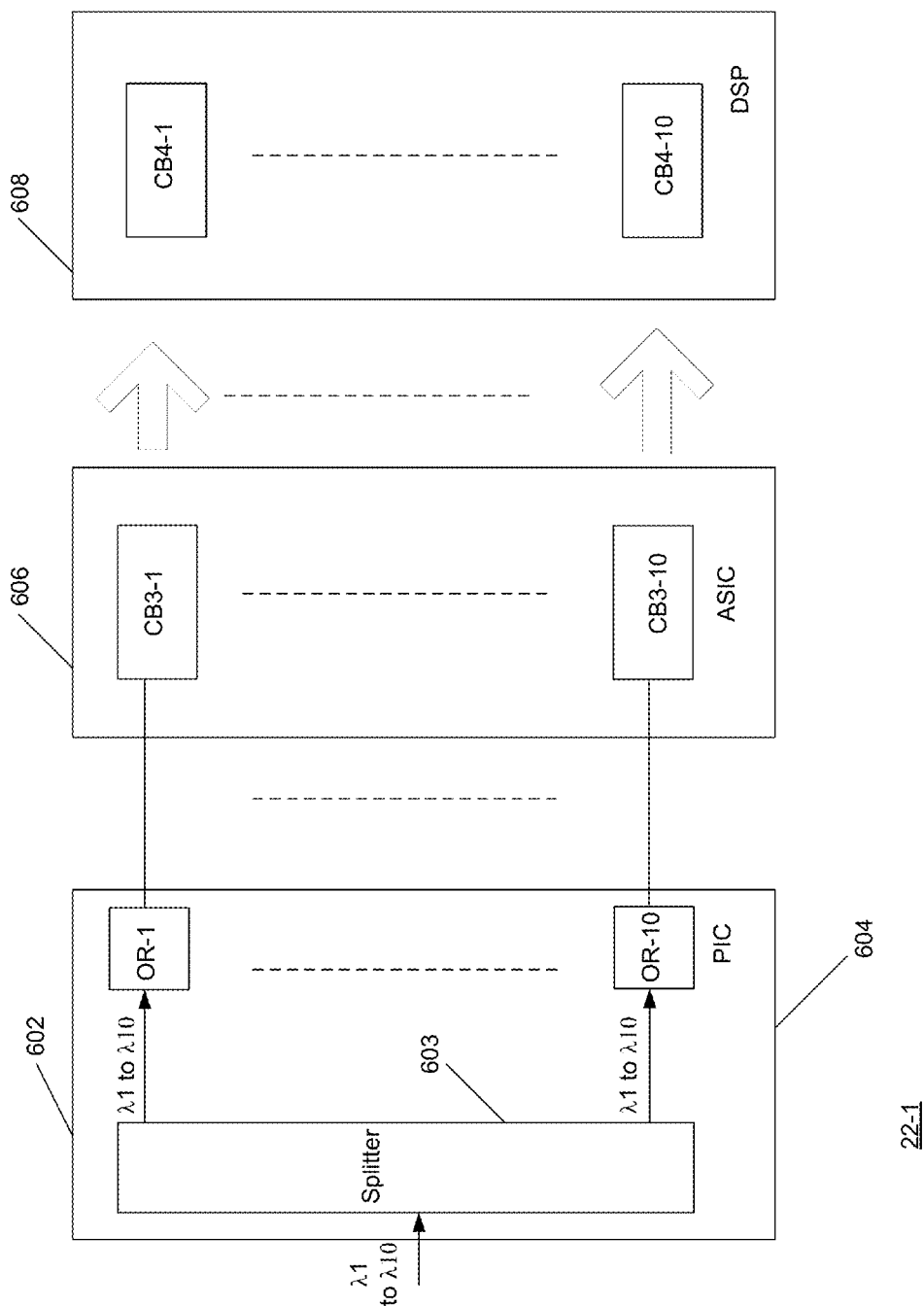
FIG. 6 illustrates a block diagram of a receive block consistent with an aspect of the present disclosure.

One of receiver blocks 22-1 is shown in greater detail in FIG. 6. It is understood that remaining receiver circuitry or blocks 22-2 to 22-n have the same or similar structure as receiver block 22-1.

Receiver block 22-1 includes a receive PIC 602 provided on substrate 604. PIC 602 includes an optical power splitter 603 that receives optical signals having wavelengths λ1 to λ10, for example, and supplies a power split portion of each optical signal (each of which itself may be considered an optical signal) to each of optical receivers OR-1 to OR-10. Each optical receiver OR-1 to OR-10, in turn, supplies a corresponding output to a respective one of circuit blocks CB3-1 to CB3-10 of ASIC 606, and each of circuit blocks CB3-1 to CB3-10, supplies a respective output to a corresponding one of circuit blocks CB4-1 to CB4-10 of DSP 608. DSP 608, in turn, outputs a copy of data Data-1 in response to the input to circuit blocks CB4-1 to CB4-10.

Figure 7:
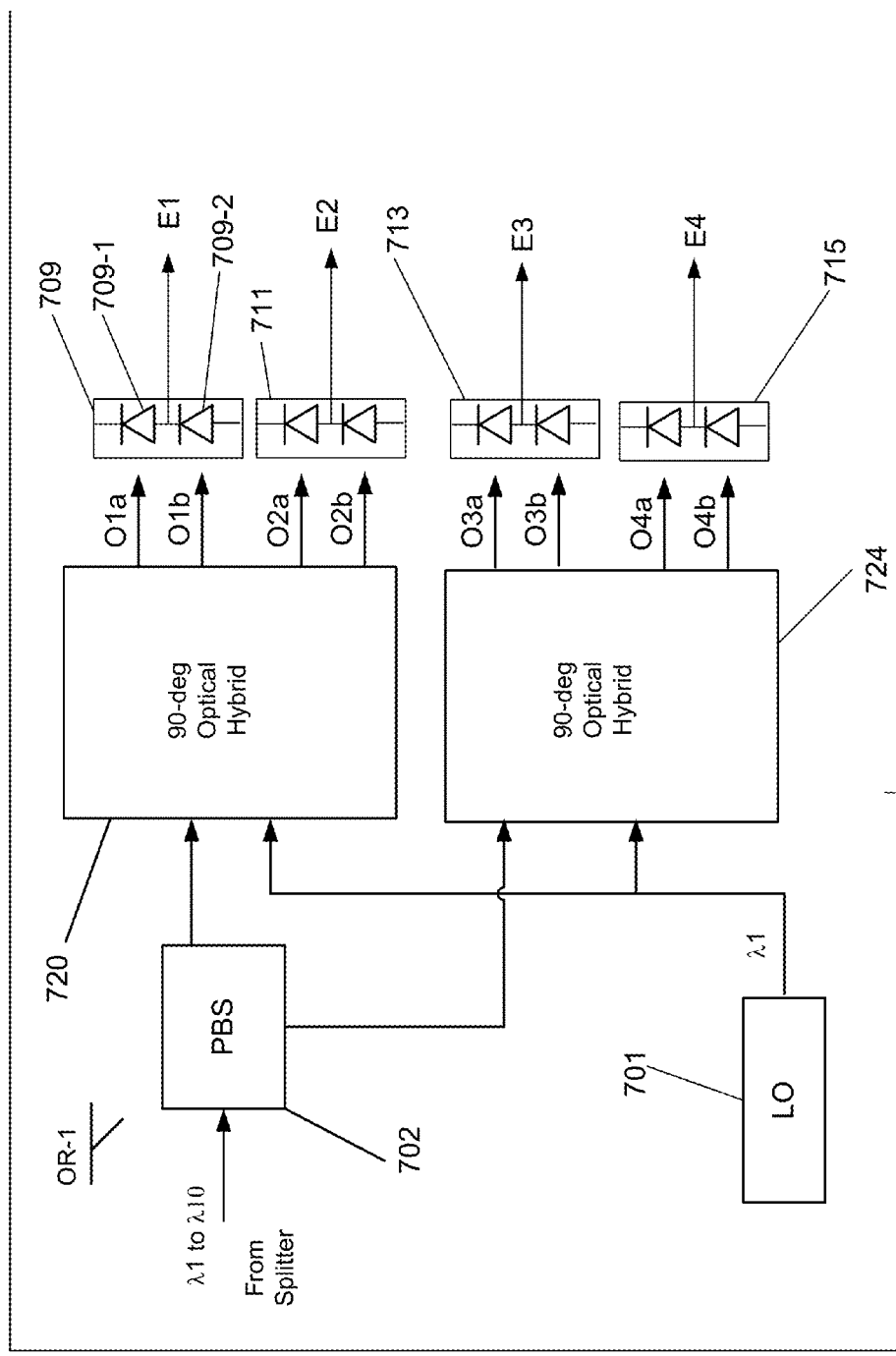
FIG. 7 illustrates a portion of a receiver photonic integrated circuit consistent with the present disclosure.

Optical receiver OR-1 is shown in greater detail in FIG. 7. It is understood that remaining optical receivers OR-2 to OR-10 have the same or similar structure as optical receiver OR-1. Optical receiver OR-1 may include a polarization beam splitter (PBS) 702 operable to receive polarization multiplexed optical signals λ1 to λ10 and to separate the signal into X and Y orthogonal polarizations, i.e., vector components of the optical E-field of the incoming optical signals transmitted on optical communication path 16, which may include an optical fiber, for example. The orthogonal polarizations are then mixed in 90 degree optical hybrid circuits ("hybrids") 720 and 724 with light from local oscillator (LO) laser 701 having wavelength λ1. Hybrid circuit 720 outputs four optical signals O1a, O1b, O2a, O2b and hybrid circuit 724 outputs four optical signals O3a, O3b, O4a, and O4b, each representing the in-phase and quadrature components of the optical E-field on X (TE) and Y (TM) polarizations, and each including light from local oscillator 701 and light from polarization beam splitter 702. Optical signals O1a, O1b, O2a, O2b, O3a, O3b, O4a, and O4b are supplied to a respective one of photodetector circuits 709, 711, 713, and 715. Each photodetector circuit includes a pair of photodiodes (such as photodiodes 709-1 and 709-2) configured as a balanced detector, for example, and each photodetector circuit supplies a corresponding one of electrical signals E1, E2, E3, and E4. Alternatively, each photodetector may include one photodiode (such as photodiode 709-1) or single-ended photodiode. Electrical signals E1 to E4 are indicative of data carried by optical signals λ1 to λ10 input to PBS 702 demodulated with LO 701 (λ1). For example, these electrical signals may comprise four baseband analog electrical signals linearly proportional to the in-phase and quadrature components of the optical E-field on X and Y polarizations.

Figure 8:
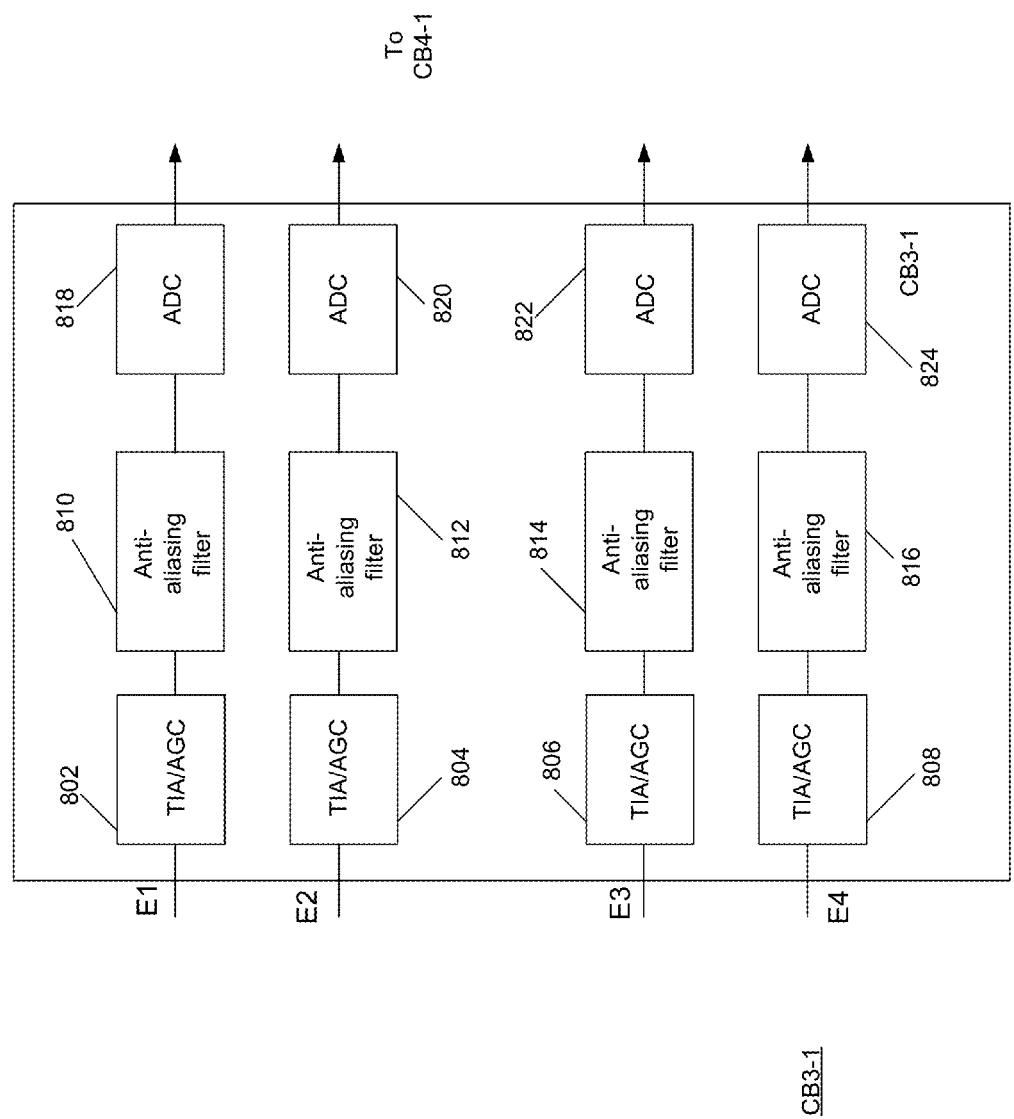
FIG. 8 illustrates a first portion of the receive block shown in FIG. 6.

FIG. 8 shows circuitry or circuit blocks CB3-1 and CB4-1 in greater detail. It is understood that remaining circuit blocks CB3-2 to CB3-10 of ASIC 606 have a similar structure and operate in a similar manner as circuit block CB3-1. In addition, it is understood that remaining circuit blocks CB4-2 to CB4-10 of DSP 608 have a similar structure and operation in a similar manner as circuit block CB4-1.

Circuit block CB3-1 includes known transimpedance amplifier and automatic gain control (TIA/AGC 802) circuitry 802, 804, 806, and 808 that receives a corresponding one of electrical signals E1, E2, E3, and E4. Circuitry 802, 804, 806, and 808, in turn, supplies corresponding electrical signals or outputs to respective ones of anti-aliasing filters 810, 812, 814, and 816, which, constitute low pass filters that further block, suppress, or attenuate high frequency components due to known "aliasing". The electrical signals or outputs form filters 810, 812, 814, and 816 are then supplied to corresponding ones of analog-to-digital converters (ADCs) 818, 820, 822, and 824.

ADCs 818, 820, 822, and 824, may sample at the same or substantially the same sampling rate as DACs 310, 312, 314, and 316 discussed above. Preferably, however, circuit block CB4-1 and DSP 608 have an associated sampling rate that is less than the DAC sampling rate, as described in greater detail in U.S. patent application Ser. No. 12/791,694 titled "Method, System, And Apparatus For Interpolating An Output Of An Analog-To-Digital Converter", filed Jun. 1, 2010, the entire contents of which are incorporated herein by reference.

Figure 9:
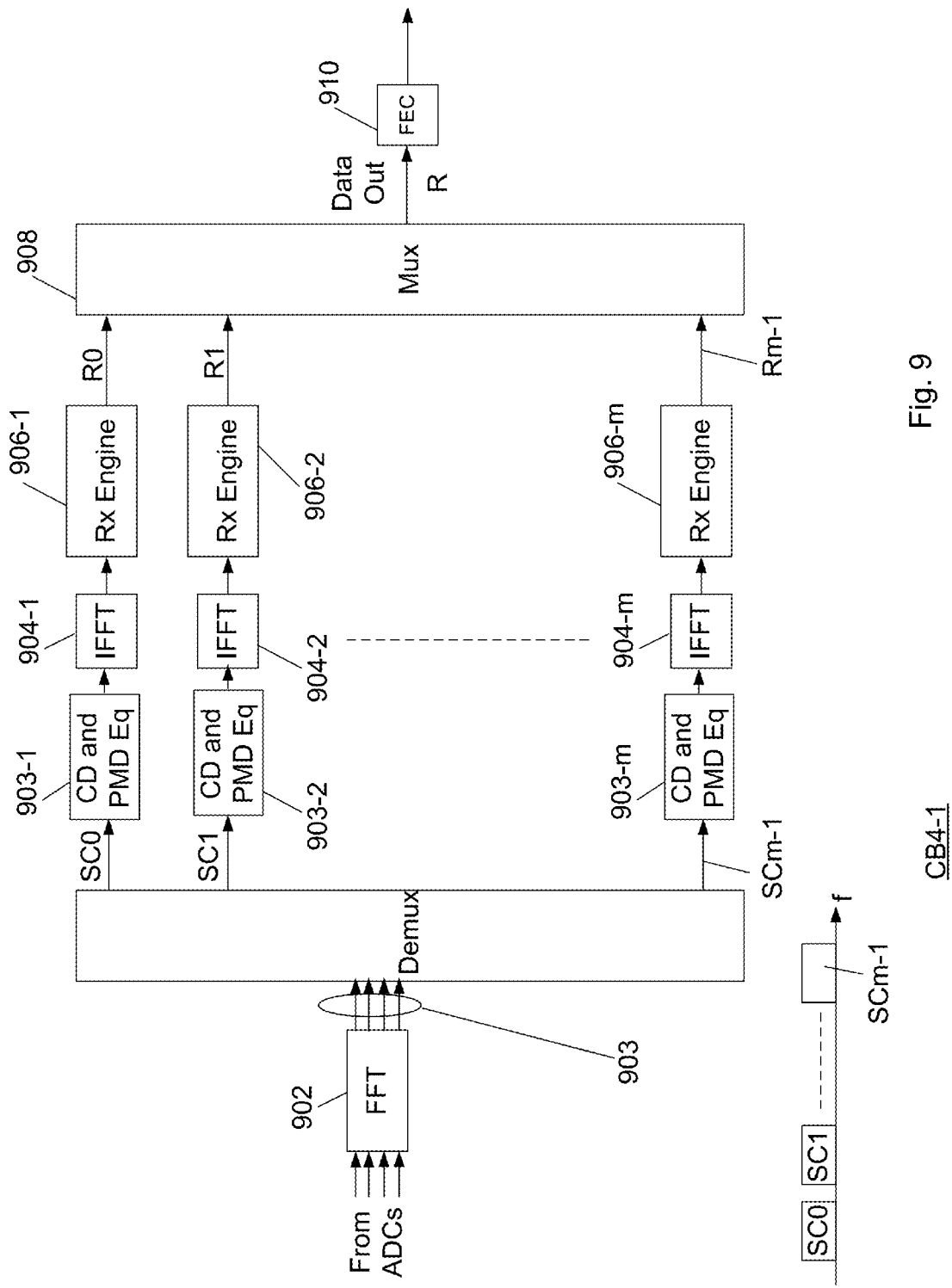
FIG. 9 illustrates a second portion of the receive block shown in FIG. 6.

Turning to FIG. 9, outputs from ADCs 818, 820, 822, and 824 are supplied to FFT 902, which converts these outputs to the frequency domain. The frequency domain signals correspond to subcarriers SC0 to SCm−1 are input to a demultiplexer, which provides each subcarrier representation to a corresponding one of chromatic dispersion (CD) and polarization mode dispersion (PMD) equalization circuits 903-1 to 903-m. Each output of CD and PM Eq circuits 903-1 to 903-m is fed to a respective one of IFFTs 904-1 to 904-m. Based on the received inputs to the IFFTs, each IFFT supplies a corresponding time domain signal to a respective one of Rx Engine circuits 906-1 to 906-m. Each of the Rx Engine circuits, in turn, may decode the received time domain signal in accordance with the modulation format associated with such signal. Each Rx Engine circuit may also be controlled by a user to accommodate an associated modulation format. The outputs of each Rx Engine circuit is a copy of a portion of Data In, at a respective one of data streams R0 to Rm−1. The data portions are supplied to a multiplexer 908, which combines the portions to provide a copy of the Data In at rate R (shown as Data Out in FIG. 9). Data Out is supplied to FEC decoder circuit 910, which performs error correction on Data Out and supplies a copy of the data stream input to the system in FIG. 1. As noted above, the same FEC engine or a common FEC engine is used to decode data carried by each subcarrier.

Figure 10:
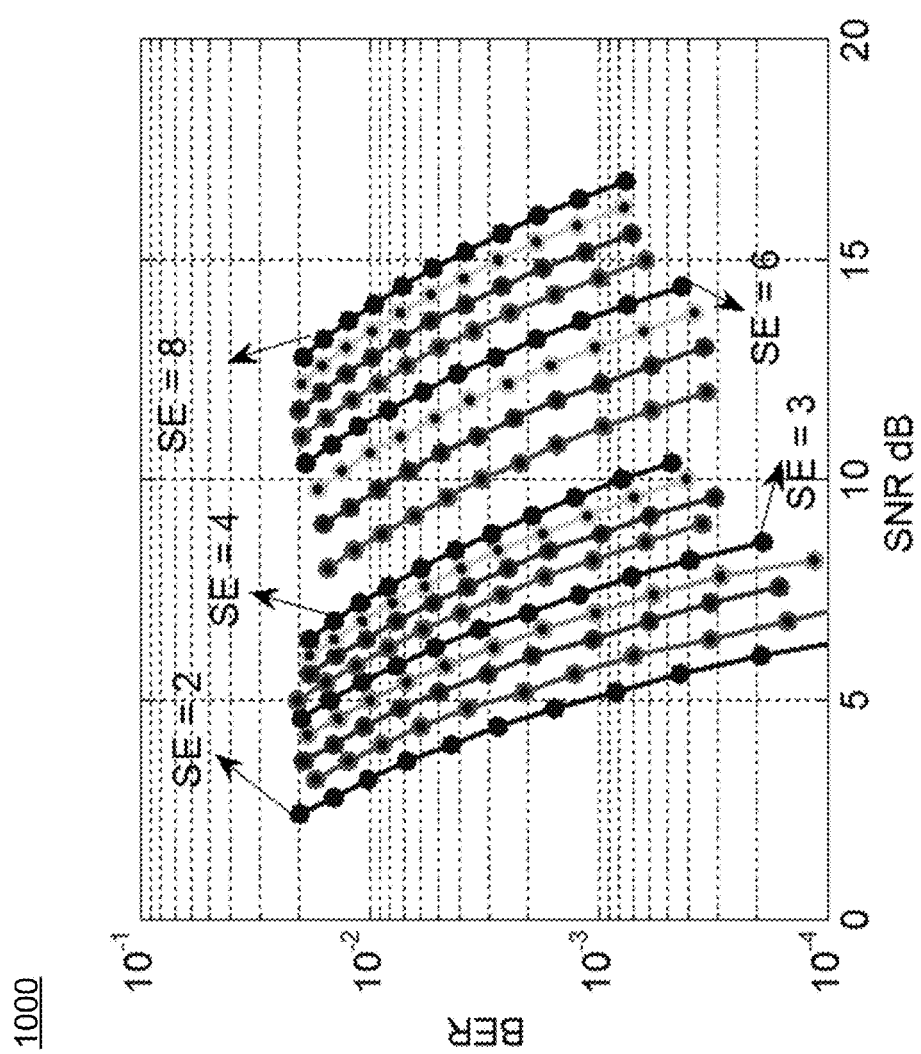
FIG. 10 illustrates a series of bit error rate (BER) vs. signal-to-noise ratio (SNR) plots consistent with an aspect of the present disclosure.

FIG. 10 illustrates a series of plots 1000 of BER vs. SNR for various SEs. SEs of 2, 4, and 8 [b/dual-pol-symbol] correspond to standard modulation formats noted above. As further seen in FIG. 10, plots between those labeled SE=2, SE=4, and SE=8 are associated with intermediate modulation formats and SEs that are obtained by combining combinations of the standard modulation format subcarriers, as discussed above. One such plot is associated with an SE of 6, for example.

It is noted that electrical signals associated with the subcarriers may experience more loss at higher frequencies than lower frequencies as such electrical signals propagate in transmission lines and traces in DSPs 202 and 608, ASICs 204 and 606, as well as in electrical connections to various devices on the transmit and receive PICs discussed above. In order to compensate for such losses (i.e., electrical transmission impairments) higher frequency subcarriers may be modulated in accordance with low order modulation formats, which are less susceptible to noise and may incur fewer errors, and lower frequency subcarriers may be modulated in accordance with higher order modulation formats, because the lower frequency subcarriers do not experience as much loss and thus will have less noise. Such lower frequency subcarriers can, therefore, carry data with fewer errors and can be modulated in accordance with a higher order modulation format.

Thus, in the examples shown in FIGS. 5b and 5c, higher frequency subcarriers SC0 and SC3 may be modulated in accordance with a lower order modulation format, such as QPSK, as noted above, or BPSK, whereas lower frequency subcarriers SC1 and SC2 may be modulated in accordance with a higher order modulation format, such as 8QAM or 16QAM.

Other transmission impairments in the electrical domain as well as those in the optical domain may also be compensated by appropriate choice of subcarrier modulation formats. For example, subcarriers can be modulated at lower order modulation formats at frequencies that are more susceptible to optical loss, polarization mode dispersion (PMD), chromatic dispersion (CD), or other optical transmission impairments. However, those subcarriers that experience fewer optical transmission impairments can be modulated at higher order modulation formats.

Figure 11:
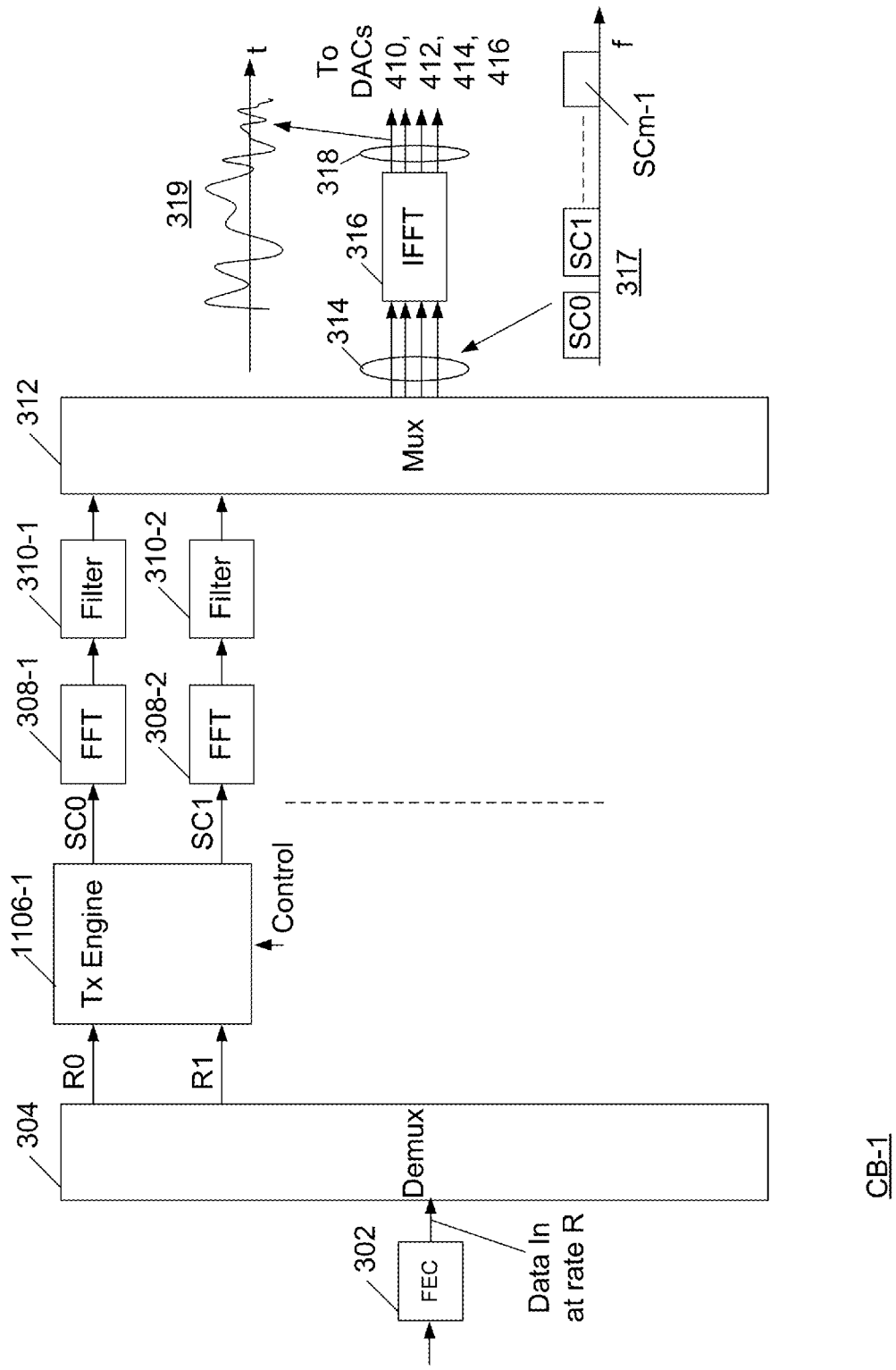
FIG. 11 illustrates an additional example of a portion of a transmission circuit consistent with the present disclosure.

FIG. 11 illustrates another example of a portion of transmission circuit 1 similar to discussed above in connection with FIG. 3a. In FIG. 11, however, one Tx Engine circuit, such as Tx Engine 1106, receives pairs of Data In portions having rates R0 and R1, respectively. This is because certain modulation formats are advantageously encoded across two subcarriers. Here, Tx Engine circuit 1106 supplies digitized analog signals representative of spectrally adjacent ones of the first plurality of subcarriers, such as SC0 and SC1. The digitized analog signals SC0 and SC1 are further processed by FFT 308-1 and 308-2, respectively, in a manner similar to or the same as that discussed above with reference to FIG. 3a. Other circuits shown in FIG. 11 also operate in a manner similar to that described above with reference to FIG. 3a.

As noted above, subcarriers in an optical signal are modulated with different modulation formats to provide a variety of SEs that facilitate efficient data transmission over a variety of optical link distances.

Other embodiments will be apparent to those skilled in the art from consideration of the specification. It is intended that the specification and examples be considered as exemplary only, with a true scope and spirit of the invention being indicated by the following claims.

What is claimed is:
1. An apparatus, comprising:
a laser that supplies light;
a modulator that receives the light; and
a transmission circuit that supplies an electrical signal to the modulator, the modulator modulating the light based on the electrical signal to generate a modulated optical signal having first and second pluralities of subcarriers, each of the first plurality of subcarriers having an associated first modulation format and each of the second plurality of subcarriers having an associated second modulation format, which is different than the first modulation format, wherein the optical signal has an average spectral efficiency (SEavg) that satisfies:

$$SEavg = A/M * X1 + B/M * X2$$

where M is a sum of A+B, A being a number of the first plurality of subcarriers and B being a number of the second plurality of subcarriers; X1 is a first spectral efficiency of the first modulation format, and X2 is a second spectral efficiency of the second modulation format.

2. The apparatus in accordance with claim 1, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±20% of the average BER.

3. The apparatus in accordance with claim 1, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±15% of the average BER.

4. The apparatus in accordance with claim 1, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±10% of the average BER.

5. The apparatus in accordance with claim 1, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±5% of the average BER.

6. An apparatus, comprising:
a laser that supplies light;
a modulator that receives the light; and
a transmission circuit that selectively supplies electrical signals to the modulator based on a plurality of control signals, such that, based on the plurality of control signals, the electrical signals are supplied to the modulator, and, based on the electrical signals, the modulator modulates the light to supply first and second pluralities of subcarriers, each of the first plurality of subcarriers having an associated first modulation format and each of the second plurality of subcarriers having an associated second modulation format, which is different than the first modulation format, wherein the optical signal has an average spectral efficiency (SEavg) that satisfies:

$$SEavg = A/M * X1 + B/M * X2$$

where M is a sum of A+B, A being a number of the first plurality of subcarriers and B being a number of the second plurality of subcarriers; X1 is a first spectral efficiency of the first modulation format, and X2 is a second spectral efficiency of the second modulation format.

7. The apparatus in accordance with claim 6, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±20% of the average BER.

8. The apparatus in accordance with claim 6, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±15% of the average BER.

9. The apparatus in accordance with claim 6, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±10% of the average BER.

10. The apparatus in accordance with claim 6, wherein an average BER (BERavg) satisfies:

$$BERavg = [X1 * BER1 + X2 * BER2]/(X1 + X2)$$

where BER1 is a bit error rate associated with each of the first plurality of subcarriers, and BER2 is a bit error rate associated with each of the second plurality of subcarriers, BER1 and BER2 being within a range of ±5% of the average BER.

11. An apparatus, comprising:
a laser that supplies light;
a modulator that receives the light; and
a transmission circuit the supplies an electrical signal to the modulator, the modulator modulating the light based on the electrical signal to generate a modulated optical signal having n pluralities of subcarriers, where n is a positive integer greater than 1, each of the n pluralities of subcarriers having a corresponding one of n modulation formats,
wherein the modulator is capable of outputting each of the n pluralities of subcarriers at a plurality of powers, the modulator supplying a first one of the plurality of n pluralities of subcarriers at a first one of the plurality of powers and a second one of the n pluralities of subcarriers at a second one of the plurality of powers, such that a ratio of the first and second powers is one of a plurality of ratios of each of the plurality of powers to one another and is associated with a Q value of the optical signal that is greater than Q values associated with remaining ones of the plurality of ratio.

12. An apparatus, comprising:
a laser that supplies light;
a modulator that receives the light; and
a transmission circuit the supplies an electrical signal to the modulator, the modulator modulating the light based on the electrical signal to generate a modulated optical signal having n pluralities of subcarriers, where n is a positive integer greater than 1, each of the n pluralities of subcarriers having a corresponding one of n modulation formats, wherein an average spectral efficiency of the optical signal (SEavg) satisfies:

$$SEavg = \frac{1}{M}\sum_{n=1}^{M} Xn$$

where M is the total number of subcarriers and Xn is the spectral efficiency of the nth subcarrier modulation format.

13. The apparatus in accordance with claim 12, wherein an average BER (BERavg) satisfies:

$$BERavg = \frac{1}{\sum_{n=1}^{M} Xn}\sum_{n=1}^{M} Xn \cdot BERn$$

where BERn is a bit error rate associated with said nth subcarrier modulation format, and each said BERn is within a range of ±20% of the average BER.

14. The apparatus in accordance with claim 12, wherein an average BER (BERavg) satisfies:

$$BERavg = \frac{1}{\sum_{n=1}^{M} Xn}\sum_{n=1}^{M} Xn \cdot BERn$$

where BERn is a bit error rate associated with said nth subcarrier modulation format, and each said BERn is within a range of ±15% of the average BER.

15. The apparatus in accordance with claim 12, wherein an average BER (BERavg) satisfies:

$$BERavg = \frac{1}{\sum_{n=1}^{M} Xn}\sum_{n=1}^{M} Xn \cdot BERn$$

where BERn is a bit error rate associated with said nth subcarrier modulation format, and each said BERn is within a range of ±10% of the average BER.

16. The apparatus in accordance with claim 12, wherein an average BER (BERavg) satisfies:

$$BERavg = \frac{1}{\sum_{n=1}^{M} Xn}\sum_{n=1}^{M} Xn \cdot BERn$$

where BERn is a bit error rate associated with said nth subcarrier modulation format, and each said BERn is within a range of ±5% of the average BER.

* * * * *